US011337095B2

(12) United States Patent
Zeng et al.

(10) Patent No.: US 11,337,095 B2
(45) Date of Patent: May 17, 2022

(54) FORWARD-LOOKING CHANNEL STATE INFORMATION PREDICTION AND REPORTING

(71) Applicant: QUALCOMM Incorporated, San Diego, CA (US)

(72) Inventors: Weiliang Zeng, San Diego, CA (US); Sanaz Barghi, Carlsbad, CA (US); Pouriya Sadeghi, San Diego, CA (US); Supratik Bhattacharjee, San Diego, CA (US); Taesang Yoo, San Diego, CA (US); Xiaoxia Zhang, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 16/734,254

(22) Filed: Jan. 3, 2020

(65) Prior Publication Data

US 2021/0211912 A1 Jul. 8, 2021

(51) Int. Cl.
*H04W 24/10* (2009.01)
*H04W 72/04* (2009.01)
*H04B 7/06* (2006.01)
*H04W 24/08* (2009.01)

(52) U.S. Cl.
CPC .......... *H04W 24/10* (2013.01); *H04B 7/0626* (2013.01); *H04W 24/08* (2013.01); *H04W 72/042* (2013.01)

(58) Field of Classification Search
CPC ... H04W 24/08; H04W 72/042; H04W 24/10; H04L 7/0626
See application file for complete search history.

(56) References Cited

U.S. PATENT DOCUMENTS

| 2008/0137635 | A1* | 6/2008 | Pan | H04L 1/0625 370/345 |
| 2016/0157235 | A1* | 6/2016 | Xue | H04W 76/27 370/329 |
| 2018/0042028 | A1* | 2/2018 | Nam | H04B 7/0626 |
| 2018/0048498 | A1* | 2/2018 | Stern-Berkowitz | H04L 5/0048 |
| 2019/0028320 | A1* | 1/2019 | Xu | H04L 5/0057 |
| 2019/0149306 | A1* | 5/2019 | Gao | H04L 5/0023 370/252 |
| 2019/0209661 | A1* | 7/2019 | Saal | A61K 38/16 |
| 2019/0261347 | A1* | 8/2019 | Harada | H04W 16/28 |

(Continued)

*Primary Examiner* — Chi Ho A Lee
(74) *Attorney, Agent, or Firm* — Holland & Hart LLP

(57) ABSTRACT

Methods, systems, and devices for wireless communications are described. A user equipment (UE) may receive, from a base station, a request that the UE report a predicted future channel state information measurement. Upon receiving the request, the UE may measure, during a first time period, a channel to obtain measured channel state information. The UE may then determine the predicted future channel state information for a second time period based on the measured channel state information. In some case, the second time period may be subsequent to the first time period. Upon determining the predicted future channel state information measurement, the UE may transmit, to the base station, a channel state information report. In some aspects, the channel state information report may be indicative of the predicted future channel state information measurement.

26 Claims, 19 Drawing Sheets

(56) References Cited

U.S. PATENT DOCUMENTS

2020/0036555 A1* 1/2020 Davydov .............. H04L 5/0094
2020/0107309 A1* 4/2020 Akoum ................. H04B 7/088
2020/0213063 A1* 7/2020 Lin ...................... H04L 1/0026
2021/0143885 A1* 5/2021 Gro ..................... H04B 7/0617
2021/0167829 A1* 6/2021 Li ........................... H04L 5/00

* cited by examiner

FORWARD-LOOKING CHANNEL STATE INFORMATION PREDICTION AND REPORTING

BACKGROUND

The following relates generally to wireless communications, and more specifically to forward-looking channel state information prediction and reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices which may be otherwise known as user equipments (UEs). Some wireless communications systems, such as 4G and 5G systems, may support channel state information operations. As demand for communication efficiency increases, some wireless communications systems, such as 4G and 5G systems, may fail to provide satisfactory channel state information, and as a result, may be unable to support high reliability or low latency communications, among other examples.

SUMMARY

The described techniques relate to improved methods, systems, devices, and apparatuses that support forward-looking channel state information prediction and reporting. Generally, the described techniques provide for a forward-looking channel state information procedure, which may enable a base station and a user equipment (UE) to identify future channel state information. In some examples, the base station may request the UE to estimate future channel state information for a downlink channel. For example, the base station may request the UE (via a downlink control information) to report estimated channel state information for a downlink communication expected to occur a number of subframes or slots into the future. In some cases, the number of subframes may be an approximation of a delay between a current channel state information measurement and an upcoming downlink transmission on the channel. Upon receiving the request, the UE may determine the predicted future channel state information measurement, and transmit, to the base station, a channel state information report that is indicative of the predicted future channel state information measurement.

A method of wireless communication at a UE is described. The method may include receiving, from a base station, a request that the UE report a predicted future channel state information measurement, determining the predicted future channel state information measurement in accordance with the request, and transmitting, to the base station, a channel state information report that is indicative of the predicted future channel state information measurement.

An apparatus for wireless communication at a UE is described. The apparatus may include a processor, memory coupled with the processor, and instructions stored in the memory. The instructions may be executable by the processor to cause the apparatus to receive, from a base station, a request that the UE report a predicted future channel state information measurement, determine the predicted future channel state information measurement in accordance with the request, and transmit, to the base station, a channel state information report that is indicative of the predicted future channel state information measurement.

Another apparatus for wireless communication at a UE is described. The apparatus may include means for receiving, from a base station, a request that the UE report a predicted future channel state information measurement, determining the predicted future channel state information measurement in accordance with the request, and transmitting, to the base station, a channel state information report that is indicative of the predicted future channel state information measurement.

A non-transitory computer-readable medium storing code for wireless communication at a UE is described. The code may include instructions executable by a processor to receive, from a base station, a request that the UE report a predicted future channel state information measurement, determine the predicted future channel state information measurement in accordance with the request, and transmit, to the base station, a channel state information report that is indicative of the predicted future channel state information measurement.

In some examples of the method, apparatuses, and non-transitory computer-readable medium described herein, determining the predicted future channel state information measurement further may include operations, features, means, or instructions for measuring, during a first time period, a channel to obtain measured channel state information, and determining the predicted future channel state information for a second time period based on the measured channel state information, where the second time period may be subsequent to the first time period.

Some examples of the method, apparatuses, and non-transitory computer-readable medium described herein may further include operations, features, means, or instructions for receiving an indication from the base station of the second time period for which the predicted future channel state information may be to be reported. In some examples of the method, apparatuses, and non-transitory computer-readable medium described herein, the indication represents a number of slots or subframes by which the second time period follows the first time period.

In some examples of the method, apparatuses, and non-transitory computer-readable medium described herein, receiving the indication may include operations, features, means, or instructions for receiving the indication via a configuration message received in advance of or together with the request. In some examples of the method, apparatuses, and non-transitory computer-readable medium described herein, the request may be based on a capability of the UE to determine the predicted future channel state information measurement.

Some examples of the method, apparatuses, and non-transitory computer-readable medium described herein may further include operations, features, means, or instructions for determining a predicted channel state information timing parameter that may be representative of a maximum delay supported by the UE between receipt of the request and a time period to which the predicted future channel state information measurement pertains or may be representative of a range of time during which the UE supports determining the predicted future channel state information measurement, and transmitting, to the base station, an indication of the predicted channel state information timing parameter, where the request may be based on the predicted channel state information timing parameter.

In some examples of the method, apparatuses, and non-transitory computer-readable medium described herein, determining the predicted channel state information timing parameter further may include operations, features, means, or instructions for measuring a Doppler shift, where the predicted channel state information timing parameter may be determined based on the Doppler shift. In some examples of the method, apparatuses, and non-transitory computer-readable medium described herein, determining the predicted channel state information timing parameter further may include operations, features, means, or instructions for determining the predicted channel state information timing parameter supported by the UE based on a capability associated with the UE.

Some examples of the method, apparatuses, and non-transitory computer-readable medium described herein may further include operations, features, means, or instructions for transmitting, to the base station, an indication of a current channel state information measurement in addition to transmission of the channel state information report that may be indicative of the predicted future channel state information measurement. In some examples of the method, apparatuses, and non-transitory computer-readable medium described herein, transmitting the channel state information report that may be indicative of the predicted future channel state information measurement may include operations, features, means, or instructions for including in the channel state information report a quantized version of the predicted future channel state information measurement.

In some examples of the method, apparatuses, and non-transitory computer-readable medium described herein, transmitting the channel state information report that may be indicative of the predicted future channel state information measurement may include operations, features, means, or instructions for including in the channel state information report a delta version of the predicted future channel state information measurement that may be relative to a current or previously reported channel state information measurement. Some examples of the method, apparatuses, and non-transitory computer-readable medium described herein may further include operations, features, means, or instructions for transmitting the channel state information report includes periodically transmitting the channel state information report or aperiodically transmitting the channel state information report.

In some examples of the method, apparatuses, and non-transitory computer-readable medium described herein, transmitting the channel state information report may include operations, features, means, or instructions for transmitting the channel state information report based on wideband channels, sub-band channels, or a combination thereof. In some examples of the method, apparatuses, and non-transitory computer-readable medium described herein, receiving the request may include operations, features, means, or instructions for receiving the request via downlink control information.

A method of wireless communication at a base station is described. The method may include transmitting, to a UE, a request that the UE report a predicted future channel state information measurement, receiving, from the UE, a channel state information report that is indicative of a predicted future channel state information measurement determined in accordance with the request, and determining one or more downlink transmission parameters based on receiving the channel state information report.

An apparatus for wireless communication at a base station is described. The apparatus may include a processor, memory coupled with the processor, and instructions stored in the memory. The instructions may be executable by the processor to cause the apparatus to transmit, to a UE, a request that the UE report a predicted future channel state information measurement, receive, from the UE, a channel state information report that is indicative of a predicted future channel state information measurement determined in accordance with the request, and determine one or more downlink transmission parameters based on receiving the channel state information report.

Another apparatus for wireless communication at a base station is described. The apparatus may include means for transmitting, to a UE, a request that the UE report a predicted future channel state information measurement, receiving, from the UE, a channel state information report that is indicative of a predicted future channel state information measurement determined in accordance with the request, and determining one or more downlink transmission parameters based on receiving the channel state information report.

A non-transitory computer-readable medium storing code for wireless communication at a base station is described. The code may include instructions executable by a processor to transmit, to a UE, a request that the UE report a predicted future channel state information measurement, receive, from the UE, a channel state information report that is indicative of a predicted future channel state information measurement determined in accordance with the request, and determine one or more downlink transmission parameters based on receiving the channel state information report.

Some examples of the method, apparatuses, and non-transitory computer-readable medium described herein may further include operations, features, means, or instructions for configuring the UE to measure, during a first time period, a channel to obtain measured channel state information, where the predicted future channel state information may be for a second time period and based on the measured channel state information, and where the second time period may be subsequent to the first time period. Some examples of the method, apparatuses, and non-transitory computer-readable medium described herein may further include operations, features, means, or instructions for transmitting, to the UE, an indication of the second time period for which the predicted future channel state information may be to be reported.

In some examples of the method, apparatuses, and non-transitory computer-readable medium described herein, the indication represents a number of slots or subframes by which the second time period follows the first time period. In some examples of the method, apparatuses, and non-transitory computer-readable medium described herein, transmitting the indication may include operations, features, means, or instructions for transmitting the indication via a configuration message transmitted in advance of or together with the request.

In some examples of the method, apparatuses, and non-transitory computer-readable medium described herein, the request may be based on a capability of the UE to determine the predicted future channel state information measurement. Some examples of the method, apparatuses, and non-transitory computer-readable medium described herein may further include operations, features, means, or instructions for receiving, from the UE, a predicted channel state information timing parameter that may be representative of a maximum delay supported by the UE between receipt of the request and a time period to which the predicted future channel state information measurement pertains or may be representative of a range of time during which the UE supports determining the predicted future channel state information measurement, and transmitting the request based on receiving the predicted channel state information timing parameter.

In some examples of the method, apparatuses, and non-transitory computer-readable medium described herein, the predicted channel state information timing parameter may be based on a Doppler shift, a capability associated with the UE, or a combination thereof. Some examples of the method, apparatuses, and non-transitory computer-readable medium described herein may further include operations, features, means, or instructions for receiving, from the UE, an indication of a current channel state information measurement in addition to reception of the channel state information report that may be indicative of the predicted future channel state information measurement.

In some examples of the method, apparatuses, and non-transitory computer-readable medium described herein, receiving the channel state information report that may be indicative of the predicted future channel state information measurement may include operations, features, means, or instructions for determining that the channel state information report includes a quantized version of the predicted future channel state information measurement. In some examples of the method, apparatuses, and non-transitory computer-readable medium described herein, receiving the channel state information report that may be indicative of the predicted future channel state information measurement may include operations, features, means, or instructions for determining that the channel state information report includes a delta version of the predicted future channel state information measurement that may be relative to a current or previously reported channel state information measurement.

In some examples of the method, apparatuses, and non-transitory computer-readable medium described herein, the one or more downlink transmission parameters include at least one of a pre-coding matrix indicator, a rank, a modulation and coding scheme, a selection of a frequency band, or a combination thereof. Some examples of the method, apparatuses, and non-transitory computer-readable medium described herein may further include operations, features, means, or instructions for receiving the channel state information report includes periodically receiving the channel state information report or aperiodically receiving the channel state information report.

In some examples of the method, apparatuses, and non-transitory computer-readable medium described herein, receiving the channel state information report may include operations, features, means, or instructions for receiving the channel state information report based on wideband channels, sub-band channels, or a combination thereof. In some examples of the method, apparatuses, and non-transitory computer-readable medium described herein, transmitting the request may include operations, features, means, or instructions for transmitting the request via a downlink control information.

A method of wireless communication at a base station is described. The method may include determining current channel state information for a downlink channel between the base station and a UE, determining, based on the current channel state information for the downlink channel, a predicted future channel state information for the downlink channel, and applying the predicted future channel state information to a downlink communication to the UE over the downlink channel.

An apparatus for wireless communication at a base station is described. The apparatus may include a processor, memory coupled with the processor, and instructions stored in the memory. The instructions may be executable by the processor to cause the apparatus to determine current channel state information for a downlink channel between the base station and a UE, determine, based on the current channel state information for the downlink channel, a predicted future channel state information for the downlink channel, and apply the predicted future channel state information to a downlink communication to the UE over the downlink channel.

Another apparatus for wireless communication at a base station is described. The apparatus may include means for determining current channel state information for a downlink channel between the base station and a UE, determining, based on the current channel state information for the downlink channel, a predicted future channel state information for the downlink channel, and applying the predicted future channel state information to a downlink communication to the UE over the downlink channel.

A non-transitory computer-readable medium storing code for wireless communication at a base station is described. The code may include instructions executable by a processor to determine current channel state information for a downlink channel between the base station and a UE, determine, based on the current channel state information for the downlink channel, a predicted future channel state information for the downlink channel, and apply the predicted future channel state information to a downlink communication to the UE over the downlink channel.

In some examples of the method, apparatuses, and non-transitory computer-readable medium described herein, determining the current channel state information for the downlink channel may include operations, features, means, or instructions for receiving an uplink sounding reference signal from the UE, and estimating the current channel state information for the downlink channel based on measurements of the uplink sounding reference signal and on a degree of reciprocity between the uplink sounding reference signal and the downlink channel. In some examples of the method, apparatuses, and non-transitory computer-readable medium described herein, determining the current channel state information for the downlink channel may include operations, features, means, or instructions for receiving channel feedback from the UE pertaining to the current channel state information.

Some examples of the method, apparatuses, and non-transitory computer-readable medium described herein may further include operations, features, means, or instructions for transmitting, to the UE, a request that the UE report interference estimated at the UE for the downlink channel, receiving, from the UE, an indication of the interference estimated for the downlink channel, and determining the predicted future channel state information for the downlink channel based on both the current channel state information for the downlink channel and the interference estimated for the downlink channel. In some examples of the method, apparatuses, and non-transitory computer-readable medium described herein, the downlink communication to the UE over the downlink channel to which the predicted future channel state information may be applied occurs a predetermined number of slots or subframes after a time to which the current channel state information pertains.

A method of wireless communication at a base station is described. The method may include receiving, from a UE, a sounding reference signal, determining, based on a measurement of the sounding reference signal, a predicted future channel state information for a second time subsequent to a first time corresponding to the measurement of the sounding reference signal, and applying the predicted future channel state information to an uplink communication received at the second time.

An apparatus for wireless communication at a base station is described. The apparatus may include a processor, memory coupled with the processor, and instructions stored in the memory. The instructions may be executable by the processor to cause the apparatus to receive, from a UE, a sounding reference signal, determine, based on a measurement of the sounding reference signal, a predicted future channel state information for a second time subsequent to a first time corresponding to the measurement of the sounding reference signal, and apply the predicted future channel state information to an uplink communication received at the second time.

Another apparatus for wireless communication at a base station is described. The apparatus may include means for receiving, from a UE, a sounding reference signal, determining, based on a measurement of the sounding reference signal, a predicted future channel state information for a second time subsequent to a first time corresponding to the measurement of the sounding reference signal, and applying the predicted future channel state information to an uplink communication received at the second time.

A non-transitory computer-readable medium storing code for wireless communication at a base station is described. The code may include instructions executable by a processor to receive, from a UE, a sounding reference signal, determine, based on a measurement of the sounding reference signal, a predicted future channel state information for a second time subsequent to a first time corresponding to the measurement of the sounding reference signal, and apply the predicted future channel state information to an uplink communication received at the second time.

In some examples of the method, apparatuses, and non-transitory computer-readable medium described herein, applying the predicted future channel state information to the uplink communication may include operations, features, means, or instructions for applying the predicted future channel state information to a slot or subframe corresponding with the second time.

DETAILED DESCRIPTION

Figure 1:
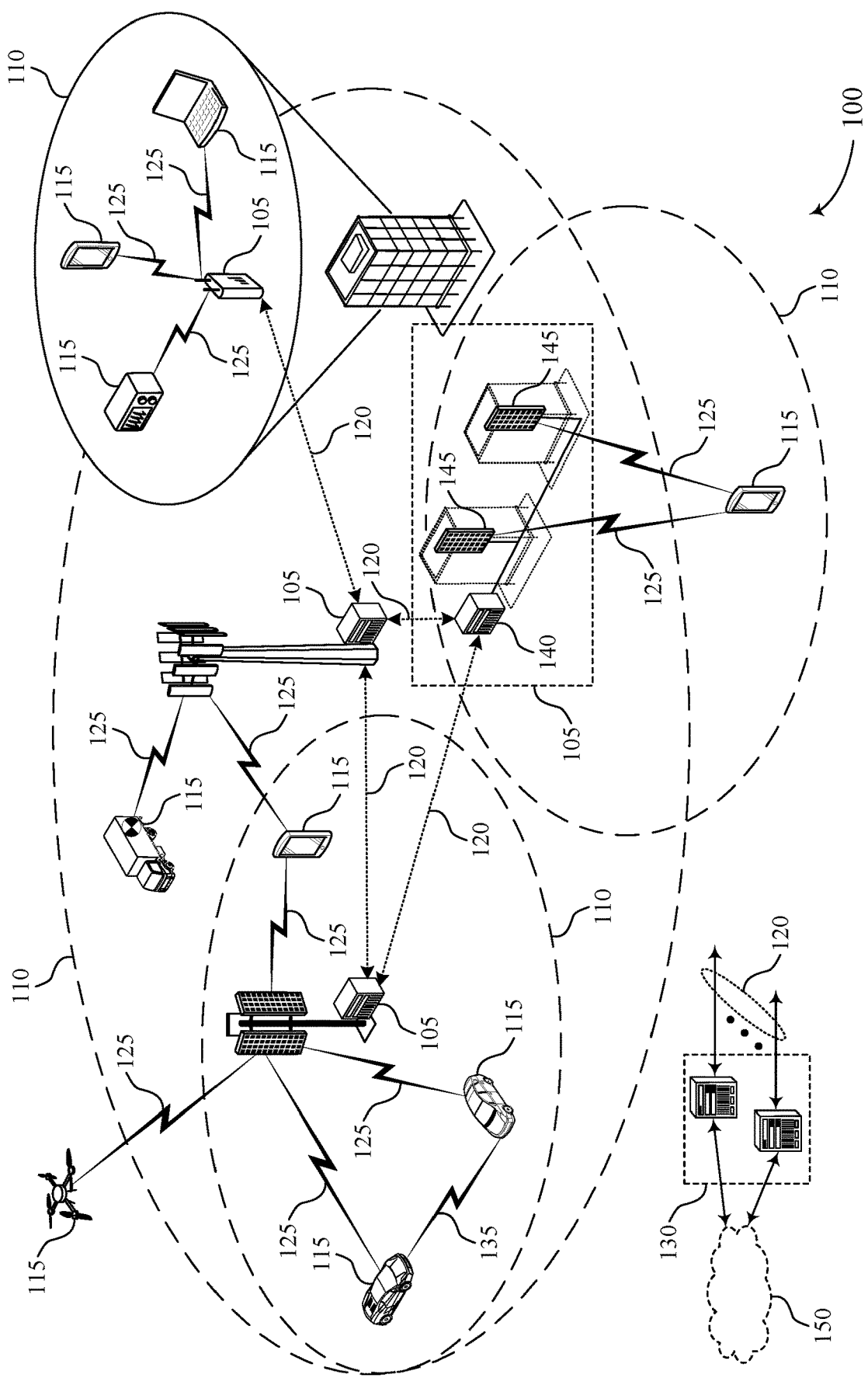
FIG. 1 illustrates an example of a wireless communications system that supports forward-looking channel state information prediction and reporting in accordance with aspects of the present disclosure.

Wireless communications systems may include multiple communication devices such as user equipments (UEs) and base stations, which may provide wireless communication services to the UEs. For example, such base stations may be next-generation NodeBs or giga-NodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems. Some UEs may support channel state information determination operations, such as channel state information reporting. In some examples, the UEs may be configured to measure reference signals transmitted by a base station and to provide channel state information reports to the base station. Although present channel state information reporting procedures, such as channel state information estimation and reporting, assist in increasing communication efficiency, the channel state information reporting procedure is reactionary (such as, in response to receipt of a reference signal) instead of proactive. In addition, current channel state information estimation and reporting procedures may necessitate a certain delay (e.g., processing delay, scheduling delay, etc.) at the base station, rendering the channel state information report provided by the UE obsolete. That is, the processing and scheduling delay at the base station may render a channel state information estimation inaccurate, as the channel may have changed. Therefore, it may be desirable for the base station and the UE to solve challenges of present channel state information estimation and reporting procedures to reduce resource overhead, power consumption, or latency at the base station and the UE.

The techniques described herein may provide for a forward-looking channel state information estimation, which may enable the base station and the UE to identify future channel state information, thereby optimizing system resources and reliability for NR communications. According to one or more aspects, the UE provides a forward-looking channel state information report in response to a request from a base station. Specifically, the base station may trigger the UE to report estimated forward-looking channel state information. In some examples, the base station may transmit the request in a downlink control information. According to some aspects of the present disclosure, the request may be enabled by UE capability. For instance, the UE may indicate (prior to receiving the request for a forward-looking channel state information report) a maximum delay (such as a maximum number of slots or subframes) or a range of delay (such as a range of slots or subframes) supported by the UE between receipt of a request for forward-looking channel state information and a time period to which the predicted future channel state information measurement pertains. In such cases, the base station may request the UE to report predicted future channel state information based on receiving the indication from the UE. The UE may then determine the predicted future channel state information measurement in accordance with the request and report the channel state information that is indicative of the predicted future channel state information measurement.

Additionally or alternatively, the present disclosure provides for the base station predicting future channel state information. For example, the base station may determine forward-looking channel state information and may apply that channel state information to an upcoming downlink channel communication.

Aspects of the disclosure are initially described in the context of a wireless communications system. Aspects of the disclosure are further illustrated by and described with reference to apparatus diagrams, system diagrams, and flowcharts that relate to forward-looking channel state information prediction and reporting.

FIG. 1 illustrates an example of a wireless communications system 100 that supports forward-looking channel state information prediction and reporting in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T\_s=1/((\Delta f\_max \cdot N\_f))$ seconds, where $\Delta f\_max$ may represent the maximum supported subcarrier spacing, and $N\_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N\_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Existing wireless communications systems provide for channel state information reporting tied to downlink channels. Generally, upon receiving a reference signal, a UE may estimate a channel state. Upon successful estimation of the channel state, the UE may report the channel state information (e.g., channel state information with quantization) to a base station. In conventional wireless communications systems, upon receiving the channel state information, the base station uses the channel state information to adjust one or more transmission parameters. However, in some instances, the channel state information report provided by a UE may be invalid by the time the base station applies the channel state information to a downlink communication. That is, a UE processing the reference signal and reporting the channel state information, and a base station processing the channel state information and applying the channel state information to a downlink communication may create processing and scheduling delay. In some cases, such processing and scheduling delay may render a channel state information estimation inaccurate as the channel may have changed. Thus, a forward-looking channel state information reporting may be desired in order to optimize system resources and reliability for NR communications.

Aspects of the present disclosure provide for wireless communications systems (such as, wireless communications system 100) to perform forward-looking channel state information prediction and reporting. According to some examples, the wireless communications system 100 may support the use of forward-looking estimates of channel state information in order to more accurately provide a downlink channel to a UE (such as UE 115). In one aspect, a base station 105 may request a UE 115 to estimate future channel state information for a downlink channel. For example, the base station 105 may request the UE to report channel state information for a downlink communication K subframes or slots into the future. In some cases, K may be an approximation of a delay between a current channel state information measurement and an upcoming downlink transmission on the channel. Upon receiving the request, the UE 115 may determine the predicted future channel state information measurement in accordance with the request, and transmit, to the base station 105, a channel state information report that is indicative of the predicted future channel state information measurement. In some aspects, the techniques for performing forward-looking channel state information described herein could also be applied to receipt of uplink communications.

Additionally or alternatively, the base station 105 may be configured to predict future channel state information. In some cases, the prediction of the future channel state information at the base station 105 may be based on measurements made by the base station 105 of an uplink reference signal (such as, uplink sounding reference signal). In some cases, the base station 105 may predict the future channel state information based on explicit channel state information and interference conditions reported by the UE 115. For example, a one or more of the base stations 105 may determine current channel state information for a downlink channel between a base station 105 and a UE 115. The base station 105 may then determine, based on the current channel state information for the downlink channel, a predicted future channel state information for the downlink channel. Upon determining the predicted future channel state information, the base station 105 may apply the predicted future channel state information to a downlink communication to the UE 115 over the downlink channel.

Figure 2:
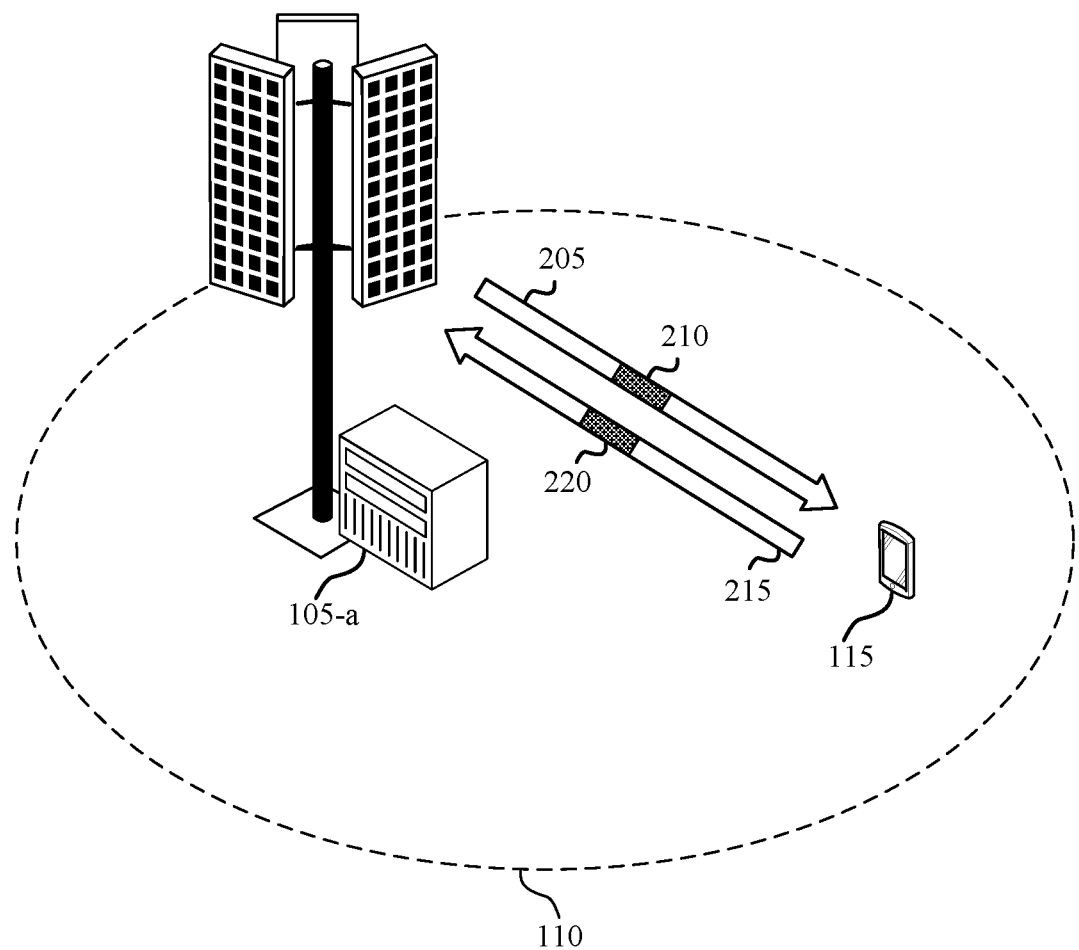
FIG. 2 illustrates an example of a wireless communications system that supports forward-looking channel state information prediction and reporting in accordance with aspects of the present disclosure.

FIG. 2 illustrates an example of a wireless communications system 200 that supports forward-looking channel state information prediction and reporting in accordance with aspects of the present disclosure. In some examples, the wireless communications system 200 may implement aspects of the wireless communications system 100. For example, the wireless communications system 200 may include a base station 105-a and a UE 115-a within a geographic coverage area 110. The base station 105-a and the UE 115-a may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency channel state information reporting, among other benefits.

The base station 105-a and the UE 115-a may be configured with multiple antennas, which may be used to employ techniques such as transmit diversity, receive diversity, multiple-input multiple-output communications, or beamforming, or any combination thereof. The antennas of the base station 105-a and the UE 115-a may be located within one or more antenna arrays or antenna panels, which may support multiple-input multiple-output operations or transmit or receive beamforming. For example, the base station 105-a antennas or antenna arrays may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-a may use to support beamforming of communications with the UE 115-a. Likewise, the UE 115-a may have one or more antenna arrays that may support various multiple-input multiple-output or beamforming operations. Additionally or alternatively, an antenna panel may support radio frequency beamforming for a signal transmitted via one or more antenna ports. The base station 105-a and the UE 115-a may thus be configured to support directional communications using the multiple antennas.

The base station 105-a and the UE 115-a may begin communicating after establishment of an initial connection. Specifically, the base station 105-a may perform a connection procedure (e.g., a radio resource control procedure, such as a cell acquisition procedure, a random-access procedure, a radio resource control connection procedure, a radio resource control configuration procedure) with the UE 115-a. For example, the base station 105-a and the UE 115-a may perform a connection procedure to establish a connection for communication (e.g., a wireless communication). In other examples, the base station 105-a and the UE 115-a may perform a connection procedure to re-establish a connection after a connection failure (e.g., a radio-link failure) with the base station 105-a, or to establish a connection for handover to another base station, or the like. As depicted herein, the base station 105-a and the UE 115-a may also support multiple radio access technologies including 4G systems such as LTE systems, LTE-A systems, or LTE-A Pro systems, and 5G systems which may be referred to as NR systems.

The connection procedure between the base station 105-a and the UE 115-a may correspond to, for example, at least one of the above example radio access technologies. By way of example, in FIG. 2, a connection procedure may be related to mmW NR systems, in which the base station 105-a and the UE 115-a may operate in mmW frequency ranges (e.g., 28 GHz, 40 GHz, 60 GHz). Communication between the base station 105-a and the UE 115-a at these frequencies may be beamformed. Thus, as part of the connection procedure, the base station 105-a and the UE 115-a may perform a beam sweep to determine a suitable beam pair (e.g., uplink and downlink beam pair) for communication between the base station 105-a and the UE 115-a. In determining a suitable beam pair, the base station 105-a and the UE 115-a may transmit one or more beamformed communication beams in different directions within a coverage area (e.g., at variable beam widths, at different elevation angles). Although not illustrated in the example of FIG. 2, it may be understood that the base station 105-a may transmit multiple beams according to a beam sweep pattern, and the UE 115-a may also transmit multiple beams according to a same or different beam sweep pattern. In an example, the beams of the UE 115-a may transmit beams or receive beams, and the beams of the base station 105-a may transmit beams or receive beams, or a combination thereof. In some examples, the beamformed communication beams include one or more signals to support effective communication. Examples of signals may include synchronization signals (e.g., a primary synchronization signal, a secondary synchronization signal, and the like) or reference signals (e.g., a channel state information reference signal, a sounding reference signal, a beam reference signal, a demodulation reference signal, or a tracking reference signal, or any combinations of such reference signals.

In wireless communications system, multiple transmission features may rely on the knowledge of channel state information. For example, a channel state information reference signal may be used as a downlink channel sounding reference signal. In some instances, the base station 105-a and the UE 115-a may each select a beam (e.g., to track beam strength, to identify emerging active beams, and the like) based a channel measurement (also referred to herein as channel state information). The channel state information may include various beam strength information (e.g., a reference signal received power, a reference signal received quality, a signal-to-noise ratio, a signal-to-interference-plus-noise ratio, an estimated block level error rate, or the like) of one or more reference signals associated with the beamformed communication beams. In some examples, based on a channel state information reference signal, the UE 115-a may estimate and report channel state information (such as, channel state information with quantization). The base station 105-a may utilize the channel state information report to adjust a transmission to the UE 115-a in order to achieve better performance. For example, the base station 105-a may select a beam for communication with the UE 115-a based a signal-to-noise ratio, a reference signal received power, or the like, while the UE 115-a may select a beam for communication with the base station 105-a based on a signal-to-interference-plus-noise ratio, a reference signal received quality, or the like.

In existing wireless communications systems, even if the UE 115-a accurately estimates and reports channel state information, it may be challenging for the base station 105-a to completely utilize the channel opportunity. Specifically, current wireless communications systems lack the ability to account for due to channel state information aging effect. In some examples, the channel state information aging effect may be generated by a processing and reporting delay at the UE 115-a, and a processing and scheduling delay at the base station 105-a. For instance, the UE 115-a may process the reference signal, and then report the channel state information based on processing the reference signal. The base station 105-a may process the channel state information and apply the channel state information to a downlink communication, thus creating the processing and scheduling delay. In some examples, the UE 115-a may report channel state information to the base station 105-a, and the base station 105-a may adjust one or more transmission parameters as a response to the channel state information. The process of adjusting the one or more transmission parameters may incur a delay (such as, processing delay, scheduling delay, etc.). In some cases, the channel may change between a time when the UE 115-a received the reference signal and a time when the base station 105-a adjusts the transmission parameters. In some examples, a channel state information aging effect may be associated with a Doppler value (e.g., 5 Hz). In some instances, the channel state information aging effect may impact the system performance (as the channel state information estimation used at the base station 105-a is inaccurate). Although present channel state information reporting techniques assist in remedying communication link problems, these channel state information reporting procedures are reactionary instead of proactive.

Some feedback techniques (such as, ACK/NACK) in wireless communications system may partially addresses the issue of channel state information aging effect. However, such feedback techniques may also have certain disadvantages. For instance, feedback techniques lack the ability to efficiently handle bursty traffic. Additionally, employing such feedback techniques may result in a mismatch with a link performance (e.g., in NR ultra reliable low latency communications). Additionally, the feedback techniques may entail a longer time to converge and may not provide high performance. Additionally, in some wireless communications systems, a base station may receive a channel state information report from a UE, and the base station may utilize the channel opportunity by increasing a rank index or a modulation or coding scheme based on the reported channel state information. However, increasing the rank index or the modulation or coding scheme may affect the performance of the UE 115-a (due to the channel state information aging effect).

In sum, current wireless communications systems provide for channel state information reporting tied to downlink channels. Generally, upon receiving a reference signal, a UE estimates and reports the channel state information, and a base station uses the channel state information to adjust the transmission in order to achieve better performance. However, in some instances, the channel state information report provided by a UE may be out of date by the time the base station applies the channel state information to an upcoming downlink communication. Therefore, it may be desirable for the base station 105-a and the UE 115-a to address challenges of present channel state information reporting procedures to reduce resource overhead, power consumption, or latency at the base station 105-a and the UE 115-a. For instance, a forward-looking channel state information reporting may be desired in order to optimize system resources and reliability for NR communications.

To address problems posed by present channel state information reporting techniques, the base station 105-a and the UE 115-a may support (e.g., independently or in conjunction) a proactive approach to determine (e.g., predict, forecast, estimate) a forward-looking channel state information. The present techniques may also provide for estimating and reporting of the forward-looking channel state information. For instance, the present disclosure provides for the use of forward-looking estimates of channel state information in order to more accurately provide a downlink channel to a UE. In some aspects, the forward-looking channel state information estimation and reporting may be enabled using neural network algorithm. In some cases, when a forward-looking channel state information is enabled and requested, a UE (e.g., UE 115-a) may report channel state information that is used for a number (e.g., K) of subframes or slots into the future. In some examples, K may be on an order of coherence time of a channel between a UE (such as, UE 115-a) and a base station (such as, base station 105-a). In one aspect, K may be an approximation of the delay between a current channel state information measurement and an upcoming downlink transmission on the channel. The techniques described in the present disclosure provide for the ability to predict the channel state information of a future subframe or slot using historical observations (e.g., based on a machine learning algorithms employing recurrent neural networks such as long short-term memory, gated recurrent units, the variations of the gated recurrent units, deep generative model etc.). As channel variation is not a stochastic process, the methods described herein may utilize correlations in the channel variation to accurately predict future channel state information.

According to one or more aspects of the present disclosure, the UE 115-a may receive, from the base station 105-a, a request 210 that the UE 115-a report a predicted future channel state information measurement. Specifically, the base station 105-a may request in a downlink control information, a predicted future channel state information (i.e., channel state information K subframes or slots after the downlink control information). In some aspects, the downlink control information may be included in downlink signal 205. In some cases, the UE 115-a may determine the predicted future channel state information measurement in accordance with the request 210. For instance, the UE 115-a may receive the request 210 to report the predicted future channel state information measurement at a first time period. The UE 115-a may measure, during the first time period, a channel to obtain a measured channel state information. The UE 115-*a* may then determine the predicted future channel state information for a second time period based on the measured channel state information, where the second time period is subsequent to the first time period. That is, the UE 115-*a* may determine estimated future channel state information for a second time period (i.e., a future time) based on measuring channel state information at a first time period (i.e., at a present time). In some cases, the base station 105-*a* may indicate the second time period for which the predicted future channel state information is to be reported. The indication may also represent a number of slots or subframes by which the second time period follows the first time period. For example, the base station 105-*a* may request for a predicted channel state information K subframes or slots in the future. In some aspects, the base station 105-*a* may transmit the indication of the second time period (e.g., using a value of K) via configuration message. The UE 115-*a* may receive the configuration message received in advance of or together with the request 210.

In some cases, the request may be based on a UE capability. For example, the UE 115-*a* may send a range of K supported by the UE 115-*a*, and the base station 105-*a* may utilize the range of K to request for the future channel state information. In some examples, the UE 115 may determine a predicted channel state information timing parameter (or K), and may transmit an indication of the predicted channel state information timing parameter to the base station. In some examples, the predicted channel state information timing parameter may be representative of a maximum delay supported by the UE 115-*a* between receipt of the request and a time period to which the predicted future channel state information measurement pertains. Additionally or alternatively, the predicted channel state information timing parameter may be representative of a range of time during which the UE 115-*a* supports determining the predicted future channel state information measurement. That is, the predicted channel state information timing parameter may be indicative of a maximum delay (such as, a maximum number of slots or subframes) or a range of delay (such as, a range of slots or subframes) supported by the UE 115-*a* between receipt of a request for a forward-looking channel state information and a time period to which the predicted future channel state information measurement pertains. The predicted channel state information timing parameter may be based on the UE capability or a Doppler shift value. According to some aspects, the UE 115-*a* may measure a Doppler shift and may determine the predicted channel state information timing parameter based on the Doppler shift.

According to some aspects, the UE 115-*a* may transmit, to the base station 105-*a*, a channel state information report 220 that is indicative of the predicted future channel state information measurement. The UE 115-*a* may transmit the channel state information report 220 in an uplink signal 215. Additionally or alternatively, the UE 115-*a* may quantize the predicted future channel state information, and may indicate the future channel state information via delta-signaling with respect to the currently measured or previously reported channel state information. For instance, the UE 115-*a* may include in the channel state information report 220, a quantized version of the predicted future channel state information measurement. Likewise, the UE 115-*a* may include in the channel state information report 220, a delta version of the predicted future channel state information measurement that is relative to a current or previously reported channel state information measurement. In some examples, the UE 115-*a* may transmit the predicted future channel state information in addition to the current channel state information.

In some cases, the UE 115-*a* may refrain from transmitting the current channel state information and may transmit the predicted future channel state information. According to some aspects, the UE 115-*a* may indicate the predicted future channel state information via periodic reporting or aperiodic reporting. Additionally or alternatively, the UE 115-*a* may indicate the predicted future channel state information via wideband reporting or sub-band reporting. As previously described, the base station 105-*a* may use the predicted future channel state information for further processing (e.g., precoding matrix indicator selection, rank selection, modulation and coding scheme selection, band selection, etc.). One or more aspects of the present disclosure may result in a throughput gain across signal-to-noise regions. Improved methods of channel state information prediction and reporting, as described herein, may result in an observed gain. Additionally or alternatively, aspects of the present disclosure may result in throughput increase.

According to some aspects, the base station 105-*a* may predict future channel state information and may apply the predicted channel state information to a channel communication. The base station 105-*a* may determine the predicted channel state information based on a current channel state information. For instance, the base station 105-*a* may determine a current channel state information for a downlink channel between the base station 105-*a* and the UE 115-*a*, and may determine the predicted future channel state information for the downlink channel based on the current channel state information for the downlink channel. The base station 105-*a* may then apply the predicted future channel state information to a downlink communication to the UE 115-*a* over the downlink channel. Additionally or alternatively, the base station 105-*a* may obtain a downlink channel based on estimation of an uplink sounding reference signal and applying channel reciprocity. For example, the base station 105-*a* may receive an uplink sounding reference signal from the UE 115-*a*. The base station 105-*a* may estimate the current channel state information for the downlink channel based on measurements of the uplink sounding reference signal and on a degree of reciprocity between the uplink sounding reference signal and the downlink channel.

In some examples, the base station 105-*a* may request the UE 115-*a* to report a noise estimation or an interference estimation. Upon receiving the noise estimation or the interference estimation from the UE 115-*a*, the base station 105-*a* may apply a channel state information prediction for a future downlink (downlink scheduled K subframes or slots in the future). For example, the base station 105-*a* may transmit, to the UE 115-*a*, a request that the UE 115-*a* report interference estimated at the UE for the downlink channel. The UE 115-*a* may estimate the interference, and may transmit an indication of the interference estimated for the downlink channel. The base station 105-*a* may then determine the predicted future channel state information for the downlink channel based on both the current channel state information for the downlink channel and the interference estimated for the downlink channel.

In some aspects, the channel state information aging effect may affect uplink communications (due to delay between uplink sounding signal and uplink transmission). According to one or more aspects of the present disclosure, the base station 105-*a* may apply a predicted future channel state information and derive a preferred uplink scheduling for a future subframe or slot (e.g., future subframe or slot including uplink communication). In some cases, the base station 105-*a* may receive, from the UE 115-*a*, a sounding reference signal. The base station 105-*a* may determine, based on a measurement of the sounding reference signal, a predicted future channel state information for a second time subsequent to a first time corresponding to the measurement of the sounding reference signal. The base station 105-*a* may then apply the predicted future channel state information to an uplink communication received at the second time.

Figure 3:
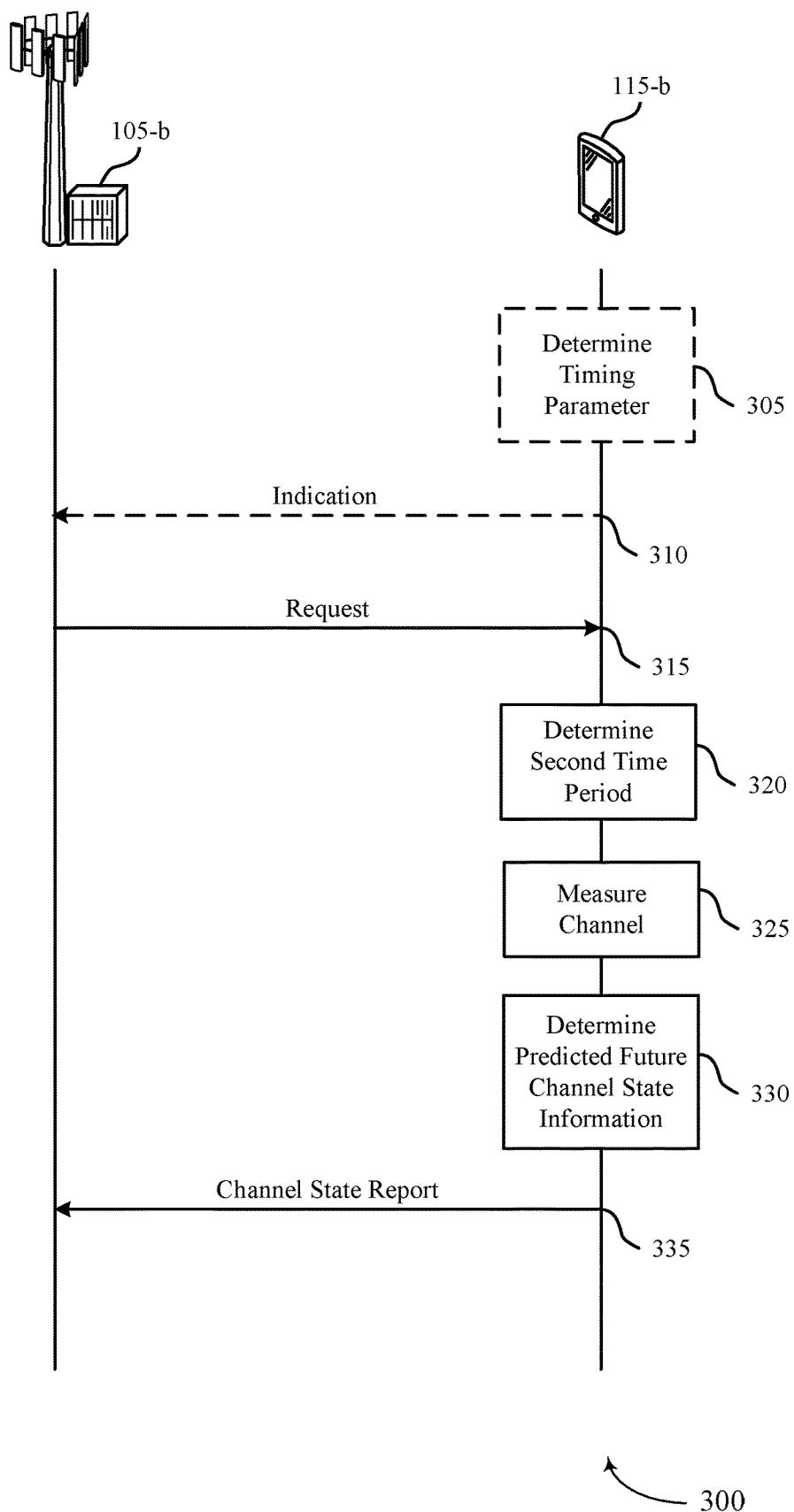
FIG. 3 illustrates an example of a process flow that supports forward-looking channel state information prediction and reporting in accordance with aspects of the present disclosure.

FIG. 3 illustrates an example of a process flow 300 that supports forward-looking channel state information prediction and reporting in accordance with aspects of the present disclosure. In some examples, process flow 300 may implement aspects of wireless communications system 100 and wireless communications system 200. Base station 105-*b* and UE 115-*b*, may be examples of the corresponding devices described with reference to FIGS. 1 and 2.

In the following description of the process flow 300, the operations between UE 115-*b* and base station 105-*b* may be transmitted in a different order than the exemplary order shown. The operations performed by UE 115-*b* or base station 105-*b* may be performed in different orders or at different times than the exemplary order shown. Some operations may also be omitted from the process flow 300, or other operations may be added to the process flow 300. Further, base station 105-*b* and UE 115-*b* are not limiting, as the described features may be associated with any number of different devices.

At 305, the UE 115-*b* may optionally determine a timing parameter (e.g., predicted channel state information timing parameter). The timing parameter may be representative of a maximum delay supported by the UE 115-*b* between receipt of the request and a time period to which the predicted future channel state information measurement pertains or is representative of a range of time during which the UE 115-*b* supports determining the predicted future channel state information measurement. For example, the UE 115-*b* may measure a Doppler shift and may determine the predicted channel state information timing parameter based on the Doppler shift. Additionally or alternatively, the UE 115-*b* may determine the predicted channel state information timing parameter supported by the UE 115-*b* based on a capability associated with the UE 115-*b*.

At 310, the UE 115-*b* may optionally transmit, to the base station 105-*b*, an indication of the predicted channel state information timing parameter. For example, the predicted channel state information timing parameter may indicate a maximum delay (such as, a maximum number of slots or subframes) or a range of delay (such as, a range of slots or subframes) supported by the UE 115-*b*.

At 315, the UE 115-*b* may receive, from the base station 105-*b*, a request that the UE 115-*b* report a predicted future channel state information measurement. For example, the base station 105-*b* may receive the indication of the predicted channel state information timing parameter from the UE 115-*b*. In such an example, the base station 105-*b* may request the predicted future channel state information measurement based on receiving the indication of the predicted channel state information timing parameter. In some examples, the base station 105-*b* may also indicate a second time period for which the predicted future channel state information is to be reported. For example, the indication may represent a number of slots or subframes by which the second time period follows a first time period. In some cases, the UE 115-*b* may receive the indication via a configuration message received in advance of or together with the request.

At 320, the UE 115-*b* may identify the UE 115-*b* may determine the second time period based on receiving the indication from the base station 105-*b*. At 325, the UE 115-*b* may measure, during a first time period, a channel to obtain measured channel state information.

At 330, the UE 115-*b* may determine the predicted future channel state information for a second time period based on the measured channel state information. In some cases, the second time period may be subsequent to the first time period. At 335, the UE 115-*b* may transmit, to the base station 105-*b*, a channel state information report that is indicative of the predicted future channel state information measurement. In some instances the UE 115-*b* may include in the channel state information report, a quantized version of the predicted future channel state information measurement. Additionally or alternatively, the UE 115-*b* may include in the channel state information report, a delta version of the predicted future channel state information measurement that is relative to a current or previously reported channel state information measurement.

The operations performed by the base station 105-*b* and the UE 115-*b* as part of, but not limited to, process flow 300 may provide improvements to communication links in wireless communications systems. Furthermore, the operations performed by the base station 105-*b* and the UE 115-*b* as part of, but not limited to, process flow 300 may provide benefits and enhancements to the operation of the UE 115-*b* while performing communications having a high reliability and low latency. For example, the described methods in the process flow 300 may support predicting future channel state information measurement in wireless communications systems, among other advantages.

Figure 4:
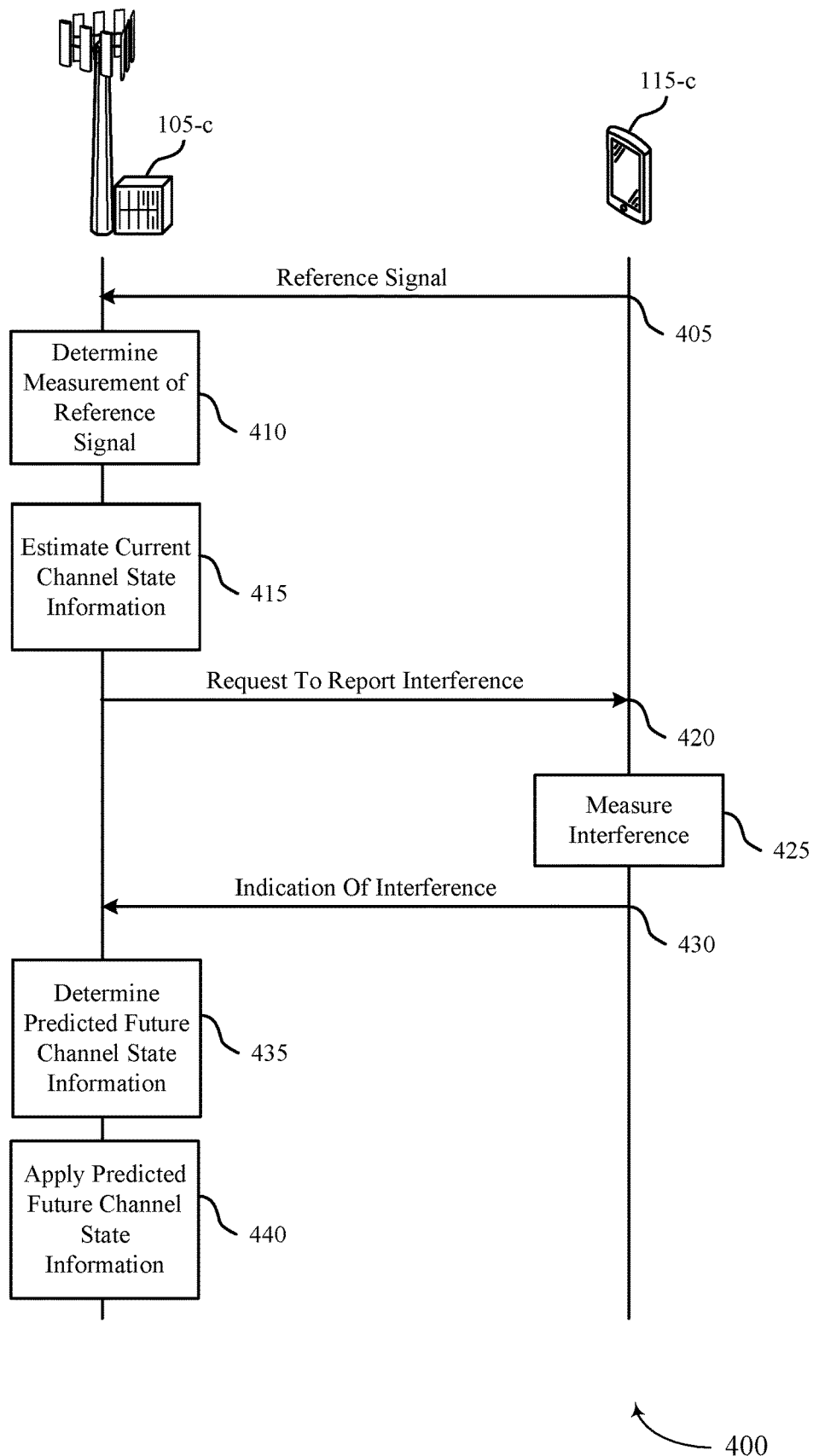
FIG. 4 illustrates an example of a process flow that supports forward-looking channel state information prediction and reporting in accordance with aspects of the present disclosure.

FIG. 4 illustrates an example of a process flow 400 that supports forward-looking channel state information prediction and reporting in accordance with aspects of the present disclosure. In some examples, process flow 400 may implement aspects of wireless communications system 100 and wireless communications system 200. Base station 105-*c* and UE 115-*c*, may be examples of the corresponding devices described with reference to FIGS. 1 and 2.

In the following description of the process flow 400, the operations between UE 115-*c* and base station 105-*c* may be transmitted in a different order than the exemplary order shown. The operations performed by UE 115-*c* or base station 105-*c* may be performed in different orders or at different times than the exemplary order shown. Some operations may also be omitted from the process flow 400, or other operations may be added to the process flow 400. Further, base station 105-*c* and UE 115-*c* are not limiting, as the described features may be associated with any number of different devices.

At 405, the base station 105-*c* may receive an uplink sounding reference signal from the UE 115-*c*. The base station 105-*c* may then determine, at 410, measurements of the uplink sounding reference signal.

At 415, the base station 105-*c* may estimate a current channel state information for a downlink channel based on measurements of the uplink sounding reference signal and on a degree of reciprocity between the uplink sounding reference signal and the downlink channel. For example, the base station 105-*c* may determine current channel state information for the downlink channel between the base station 105-*c* and the UE 115-*c* based on the measurements of the uplink sounding reference signal.

At 420, the base station 105-*c* may transmit, to the UE 115-*c*, a request that the UE 115-*c* report interference estimated at the UE 115-*c* for the downlink channel. At 425, the UE 115-*c* may estimate the interference at the UE 115-*c*.

At 430, the UE 115-c may transmit the indication of the interference estimated for the downlink channel. The base station 105-c may receive the indication of the interference from the UE 115-c, and at 435, the base station 105-c may determine the predicted future channel state information for the downlink channel based on both the current channel state information for the downlink channel and the interference estimated for the downlink channel.

At 435, the base station 105-c may apply the predicted future channel state information to a downlink communication to the UE 115-c over the downlink channel.

The operations performed by the base station 105-c and the UE 115-c as part of, but not limited to, process flow 400 may provide improvements to communication links in wireless communications systems. Furthermore, the operations performed by the base station 105-c and the UE 115-c as part of, but not limited to, process flow 400 may provide benefits and enhancements to the operation of the base station 105-c while performing communications.

Figure 5:
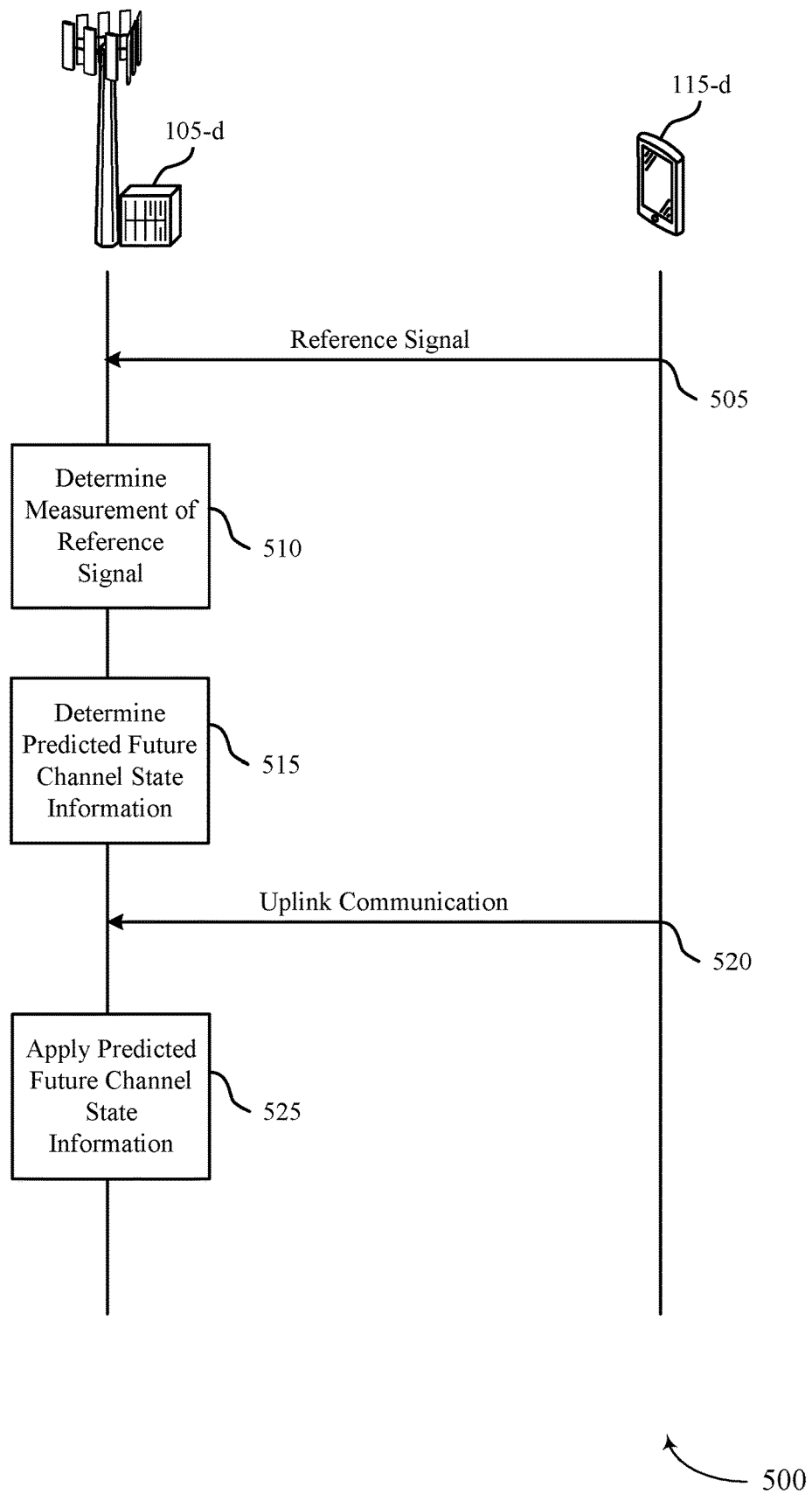
FIG. 5 illustrates an example of a process flow that supports forward-looking channel state information prediction and reporting in accordance with aspects of the present disclosure.

FIG. 5 illustrates an example of a process flow 500 that supports forward-looking channel state information prediction and reporting in accordance with aspects of the present disclosure. In some examples, process flow 500 may implement aspects of wireless communications system 100 and wireless communications system 200. Base station 105-d and UE 115-d, may be examples of the corresponding devices described with reference to FIGS. 1 and 2.

In the following description of the process flow 500, the operations between UE 115-d and base station 105-d may be transmitted in a different order than the exemplary order shown. The operations performed by UE 115-d or base station 105-d may be performed in different orders or at different times than the exemplary order shown. Some operations may also be omitted from the process flow 500, or other operations may be added to the process flow 500. Further, base station 105-d and UE 115-d are not limiting, as the described features may be associated with any number of different devices.

At 505, the base station 105-d may receive a sounding reference signal from the UE 115-d. At 510, the base station 105-d may determine measurements of the uplink sounding reference signal. At 515, the base station 105-d may determine, based on a measurement of the sounding reference signal, a predicted future channel state information for a second time subsequent to a first time corresponding to the measurement of the sounding reference signal.

At 520, the base station 105-d may receive an uplink communication from the UE 115-d. In some examples, the base station 105-d may receive the uplink communication at the second time. At 525, the base station 105-d may apply the predicted future channel state information to the uplink communication received at the second time.

The operations performed by the base station 105-d and the UE 115-d as part of, but not limited to, process flow 500 may provide improvements to communication links in wireless communications systems. Furthermore, the operations performed by the base station 105-d and the UE 115-d as part of, but not limited to, process flow 500 may provide benefits and enhancements to the operation of the base station 105-d while receiving uplink communication.

Figure 6:
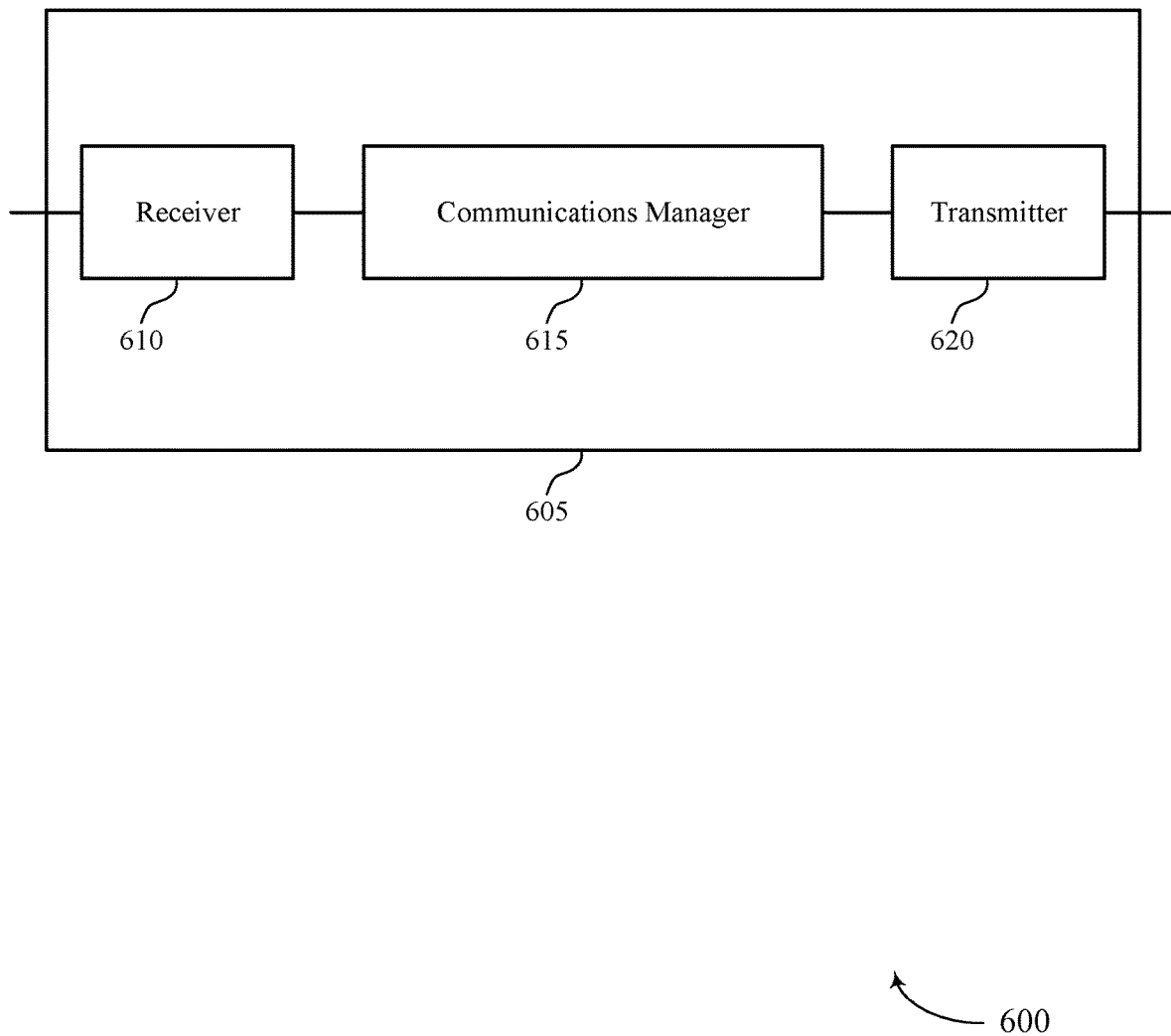
FIGS. 6 and 7 show block diagrams of devices that support forward-looking channel state information prediction and reporting in accordance with aspects of the present disclosure.

FIG. 6 shows a block diagram 600 of a device 605 that supports forward-looking channel state information prediction and reporting in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to forward-looking channel state information prediction and reporting, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a request that the UE report a predicted future channel state information measurement, determine the predicted future channel state information measurement in accordance with the request, and transmit, to the base station, a channel state information report that is indicative of the predicted future channel state information measurement. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
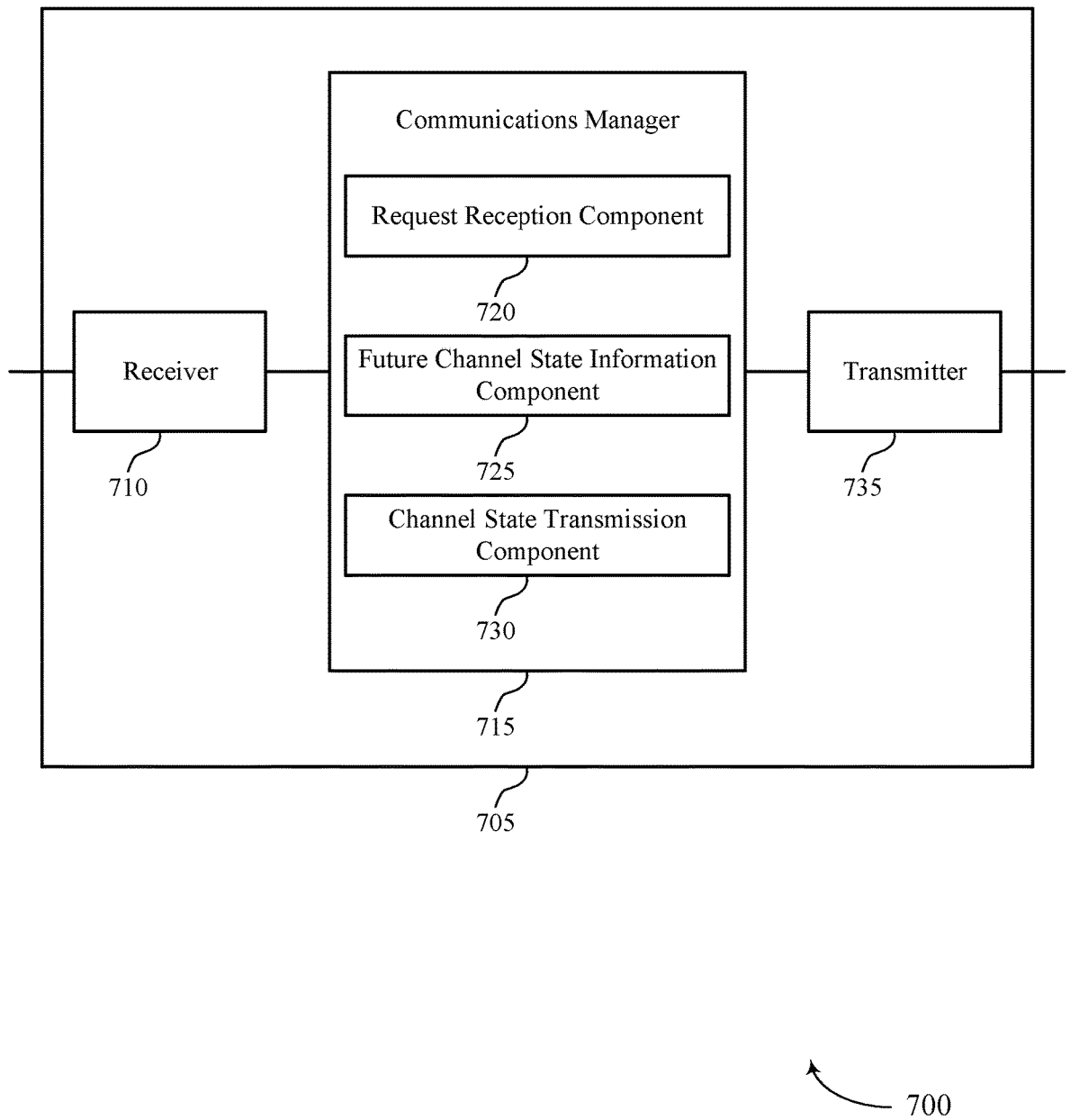

FIG. 7 shows a block diagram 700 of a device 705 that supports forward-looking channel state information prediction and reporting in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to forward-looking channel state information prediction and reporting, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a request reception component 720, a future channel state information component 725, and a channel state transmission component 730. The communications manager 715 may be an example of aspects of the communications manager 910 described herein.

The request reception component 720 may receive, from a base station, a request that the UE report a predicted future channel state information measurement. The future channel state information component 725 may determine the predicted future channel state information measurement in accordance with the request. The channel state transmission component 730 may transmit, to the base station, a channel state information report that is indicative of the predicted future channel state information measurement.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
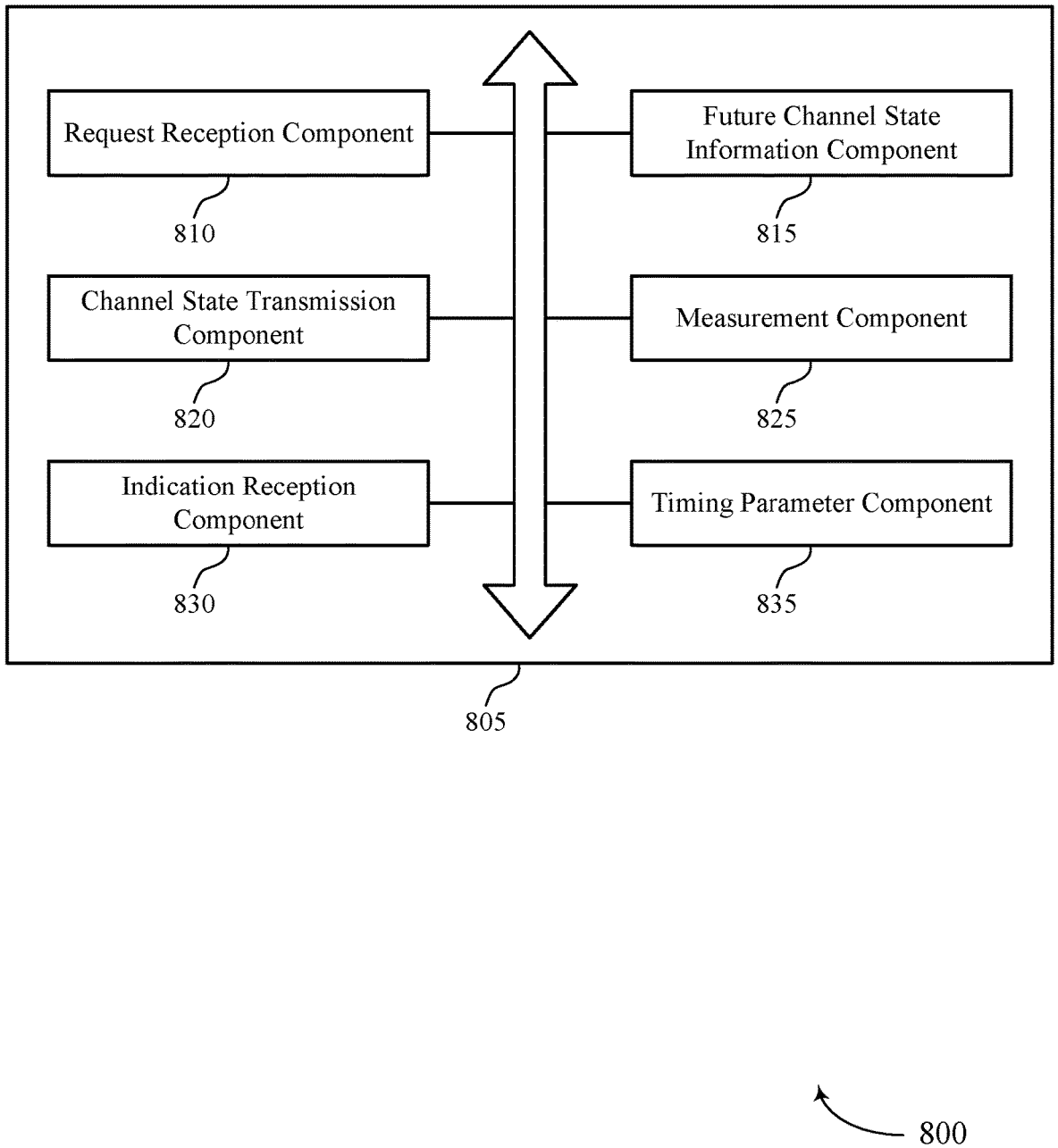
FIG. 8 shows a block diagram of a communications manager that supports forward-looking channel state information prediction and reporting in accordance with aspects of the present disclosure.

FIG. 8 shows a block diagram 800 of a communications manager 805 that supports forward-looking channel state information prediction and reporting in accordance with aspects of the present disclosure. The communications manager 805 may be an example of aspects of a communications manager 615, a communications manager 715, or a communications manager 910 described herein. The communications manager 805 may include a request reception component 810, a future channel state information component 815, a channel state transmission component 820, a measurement component 825, an indication reception component 830, and a timing parameter component 835. Each of these modules may communicate, directly or indirectly, with one another (e.g., via one or more buses).

The request reception component 810 may receive, from a base station, a request that the UE report a predicted future channel state information measurement. In some examples, receiving the request includes receiving the request via downlink control information. In some cases, the request is based on a capability of the UE to determine the predicted future channel state information measurement. The future channel state information component 815 may determine the predicted future channel state information measurement in accordance with the request. The channel state transmission component 820 may transmit, to the base station, a channel state information report that is indicative of the predicted future channel state information measurement.

The measurement component 825 may measure, during a first time period, a channel to obtain measured channel state information. In some examples, the future channel state information component 815 may determine the predicted future channel state information for a second time period based on the measured channel state information, where the second time period is subsequent to the first time period.

The indication reception component 830 may receive an indication from the base station of the second time period for which the predicted future channel state information is to be reported. In some cases, the indication represents a number of slots or subframes by which the second time period follows the first time period. In some examples, the indication reception component 830 may receive the indication via a configuration message received in advance of or together with the request.

The timing parameter component 835 may determine a predicted channel state information timing parameter that is representative of a maximum delay supported by the UE between receipt of the request and a time period to which the predicted future channel state information measurement pertains or is representative of a range of time during which the UE supports determining the predicted future channel state information measurement. In some examples, the timing parameter component 835 may transmit, to the base station, an indication of the predicted channel state information timing parameter, where the request is based on the predicted channel state information timing parameter.

In some examples, the timing parameter component 835 may measure a Doppler shift, where the predicted channel state information timing parameter is determined based on the Doppler shift. In some examples, the timing parameter component 835 may determine the predicted channel state information timing parameter supported by the UE based on a capability associated with the UE.

In some examples, the channel state transmission component 820 may transmit, to the base station, an indication of a current channel state information measurement in addition to transmission of the channel state information report that is indicative of the predicted future channel state information measurement. In some examples, the channel state transmission component 820 may include in the channel state information report a quantized version of the predicted future channel state information measurement. In some examples, the channel state transmission component 820 may include in the channel state information report a delta version of the predicted future channel state information measurement that is relative to a current or previously reported channel state information measurement.

In some examples, transmitting the channel state information report includes periodically transmitting the channel state information report or aperiodically transmitting the channel state information report. In some examples, transmitting the channel state information report includes transmitting the channel state information report based on wideband channels, sub-band channels, or a combination thereof.

Figure 9:
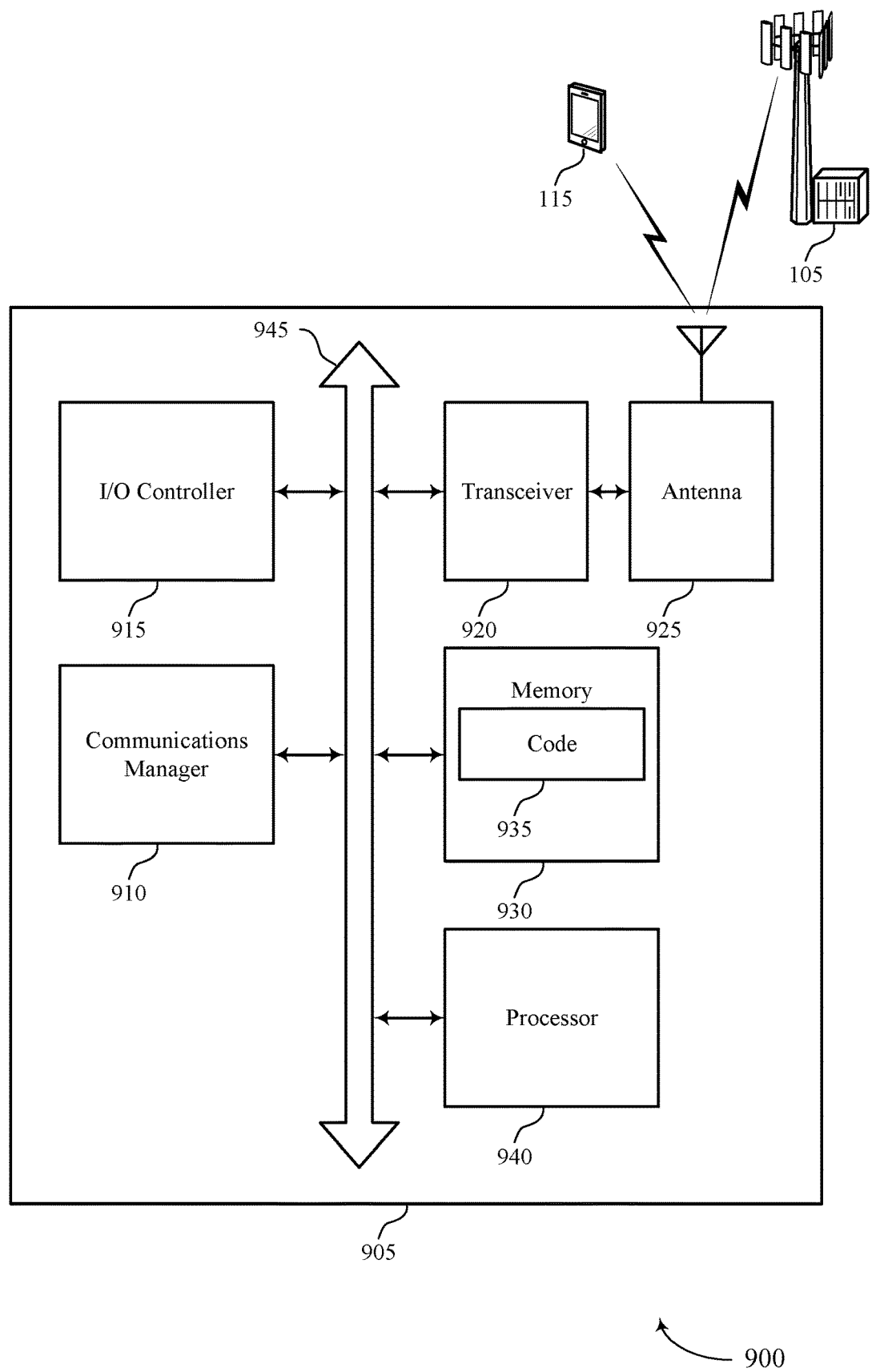
FIG. 9 shows a diagram of a system including a device that supports forward-looking channel state information prediction and reporting in accordance with aspects of the present disclosure.

FIG. 9 shows a diagram of a system 900 including a device 905 that supports forward-looking channel state information prediction and reporting in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a request that the UE report a predicted future channel state information measurement, determine the predicted future channel state information measurement in accordance with the request, and transmit, to the base station, a channel state information report that is indicative of the predicted future channel state information measurement.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting forward-looking channel state information prediction and reporting).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
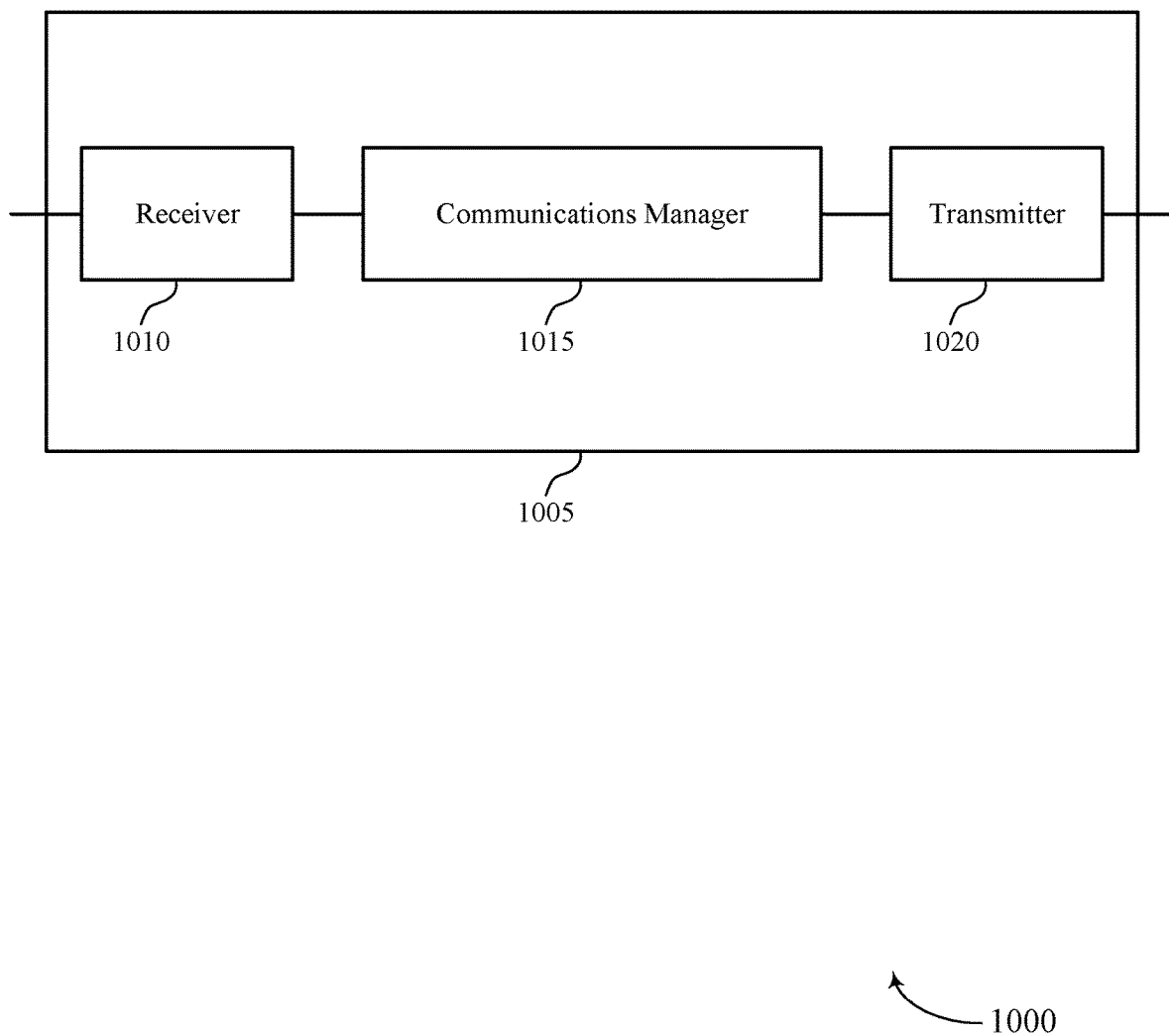
FIGS. 10 and 11 show block diagrams of devices that support forward-looking channel state information prediction and reporting in accordance with aspects of the present disclosure.

FIG. 10 shows a block diagram 1000 of a device 1005 that supports forward-looking channel state information prediction and reporting in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to forward-looking channel state information prediction and reporting, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a request that the UE report a predicted future channel state information measurement. The communications manager 1015 may then receive, from the UE, a channel state information report that is indicative of a predicted future channel state information measurement determined in accordance with the request, and determine one or more downlink transmission parameters based on receiving the channel state information report.

The communications manager 1015 may also determine current channel state information for a downlink channel between the base station and a UE. The communications manager 1015 may determine, based on the current channel state information for the downlink channel, a predicted future channel state information for the downlink channel, and apply the predicted future channel state information to a downlink communication to the UE over the downlink channel.

The communications manager 1015 may also receive, from a UE, a sounding reference signal. In some examples, the communications manager 1015 may determine, based on a measurement of the sounding reference signal, a predicted future channel state information for a second time subsequent to a first time corresponding to the measurement of the sounding reference signal, and apply the predicted future channel state information to an uplink communication received at the second time. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
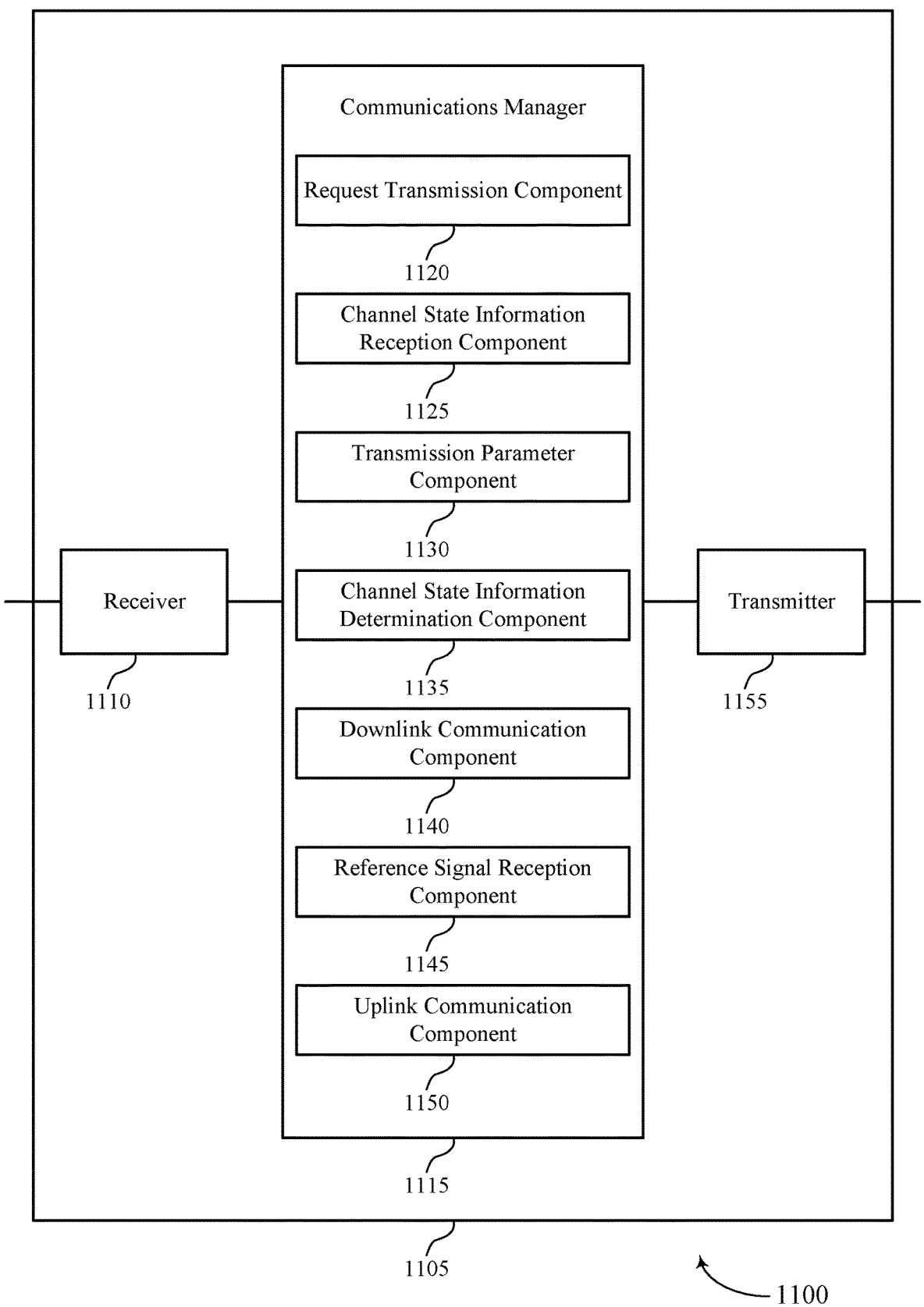

FIG. 11 shows a block diagram 1100 of a device 1105 that supports forward-looking channel state information prediction and reporting in accordance with aspects of the present disclosure. The device 1105 may be an example of aspects of a device 1005, or a base station 105 as described herein. The device 1105 may include a receiver 1110, a communications manager 1115, and a transmitter 1155. The device 1105 may also include a processor. Each of these components may be in communication with one another (e.g., via one or more buses).

The receiver 1110 may receive information such as packets, user data, or control information associated with various information channels (e.g., control channels, data channels, and information related to forward-looking channel state information prediction and reporting, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a request transmission component 1120, a channel state information reception component 1125, a transmission parameter component 1130, a channel state information determination component 1135, a downlink communication component 1140, a reference signal reception component 1145, and an uplink communication component 1150. The communications manager 1115 may be an example of aspects of the communications manager 1310 described herein.

The request transmission component 1120 may transmit, to a UE, a request that the UE report a predicted future channel state information measurement. The channel state information reception component 1125 may receive, from the UE, a channel state information report that is indicative of a predicted future channel state information measurement determined in accordance with the request. The transmission parameter component 1130 may determine one or more downlink transmission parameters based on receiving the channel state information report.

The channel state information determination component 1135 may determine current channel state information for a downlink channel between the base station and a UE and determine, based on the current channel state information for the downlink channel, a predicted future channel state information for the downlink channel. The downlink communication component 1140 may apply the predicted future channel state information to a downlink communication to the UE over the downlink channel.

The reference signal reception component 1145 may receive, from a UE, a sounding reference signal. The channel state information determination component 1135 may determine, based on a measurement of the sounding reference signal, a predicted future channel state information for a second time subsequent to a first time corresponding to the measurement of the sounding reference signal. The uplink communication component 1150 may apply the predicted future channel state information to an uplink communication received at the second time.

The transmitter 1155 may transmit signals generated by other components of the device 1105. In some examples, the transmitter 1155 may be collocated with a receiver 1110 in a transceiver module. For example, the transmitter 1155 may be an example of aspects of the transceiver 1320 described with reference to FIG. 13. The transmitter 1155 may utilize a single antenna or a set of antennas.

Figure 12:
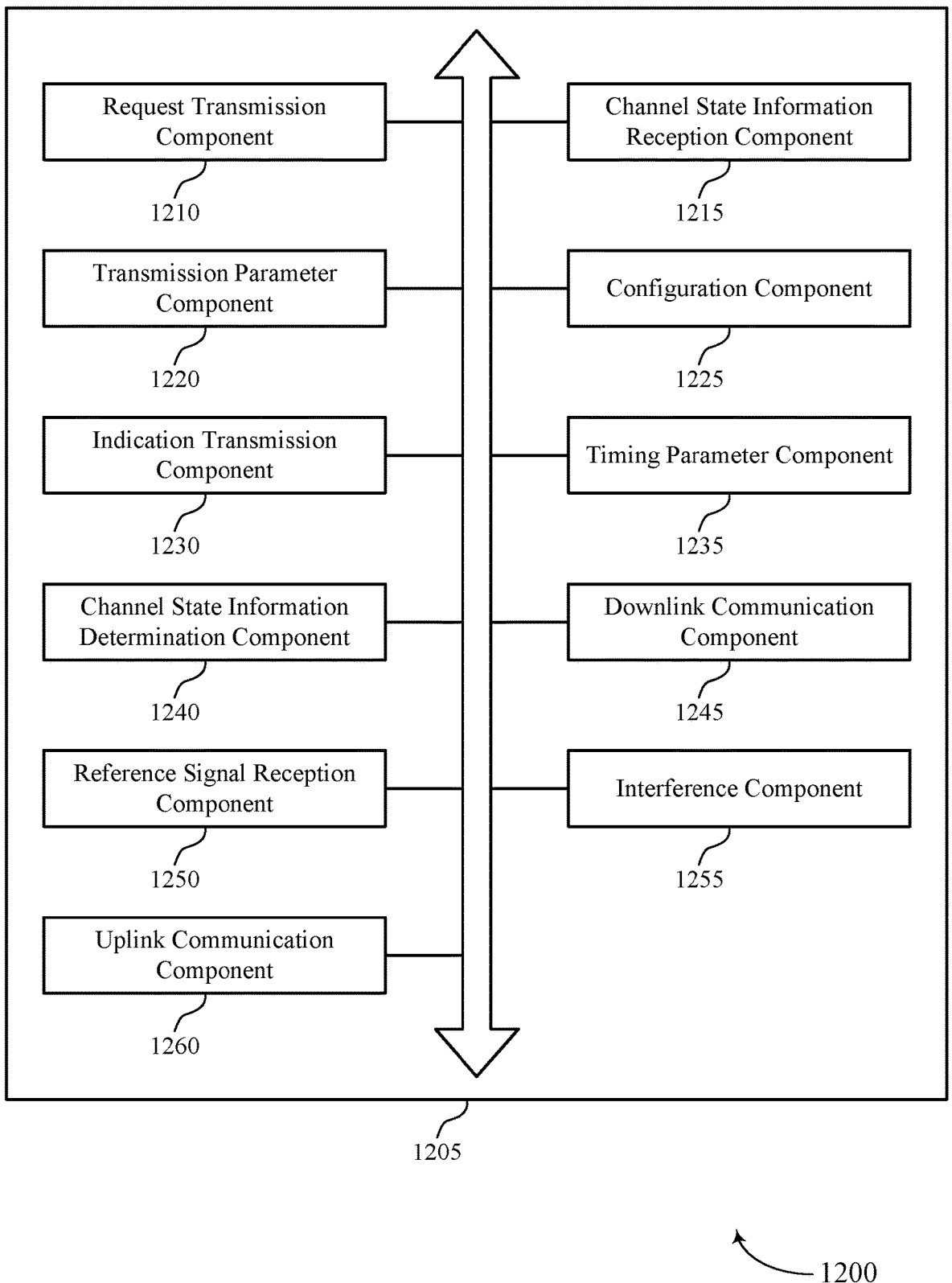
FIG. 12 shows a block diagram of a communications manager that supports forward-looking channel state information prediction and reporting in accordance with aspects of the present disclosure.

FIG. 12 shows a block diagram 1200 of a communications manager 1205 that supports forward-looking channel state information prediction and reporting in accordance with aspects of the present disclosure. The communications manager 1205 may be an example of aspects of a communications manager 1015, a communications manager 1115, or a communications manager 1310 described herein. The communications manager 1205 may include a request transmission component 1210, a channel state information reception component 1215, a transmission parameter component 1220, a configuration component 1225, an indication transmission component 1230, a timing parameter component 1235, a channel state information determination component 1240, a downlink communication component 1245, a reference signal reception component 1250, an interference component 1255, and an uplink communication component 1260. Each of these modules may communicate, directly or indirectly, with one another (e.g., via one or more buses).

The request transmission component 1210 may transmit, to a UE, a request that the UE report a predicted future channel state information measurement. In some examples, transmitting the request includes transmitting the request via a downlink control information. In some cases, the request is based on a capability of the UE to determine the predicted future channel state information measurement.

The channel state information reception component 1215 may receive, from the UE, a channel state information report that is indicative of a predicted future channel state information measurement determined in accordance with the request. The transmission parameter component 1220 may determine one or more downlink transmission parameters based on receiving the channel state information report. In some cases, the one or more downlink transmission parameters include at least one of a pre-coding matrix indicator, a rank, a modulation and coding scheme, a selection of a frequency band, or a combination thereof.

The configuration component 1225 may configure the UE to measure, during a first time period, a channel to obtain measured channel state information, where the predicted future channel state information is for a second time period and based on the measured channel state information, and where the second time period is subsequent to the first time period.

The indication transmission component 1230 may transmit, to the UE, an indication of the second time period for which the predicted future channel state information is to be reported. In some examples, the indication transmission component 1230 may transmit the indication via a configuration message transmitted in advance of or together with the request. In some cases, the indication represents a number of slots or subframes by which the second time period follows the first time period.

The timing parameter component 1235 may receive, from the UE, a predicted channel state information timing parameter that is representative of a maximum delay supported by the UE between receipt of the request and a time period to which the predicted future channel state information measurement pertains or is representative of a range of time during which the UE supports determining the predicted future channel state information measurement. In some cases, the predicted channel state information timing parameter is based on a Doppler shift, a capability associated with the UE, or a combination thereof. In some examples, the request transmission component 1210 may transmit the request based on receiving the predicted channel state information timing parameter.

In some examples, the channel state information reception component 1215 may receive, from the UE, an indication of a current channel state information measurement in addition to reception of the channel state information report that is indicative of the predicted future channel state information measurement. In some examples, the channel state information reception component 1215 may determine that the channel state information report includes a quantized version of the predicted future channel state information measurement.

In some examples, the channel state information reception component 1215 may determine that the channel state information report includes a delta version of the predicted future channel state information measurement that is relative to a current or previously reported channel state information measurement.

In some examples, receiving the channel state information report includes periodically receiving the channel state information report or aperiodically receiving the channel state information report. In some examples, receiving the channel state information report includes receiving the channel state information report based on wideband channels, sub-band channels, or a combination thereof.

The channel state information determination component 1240 may determine current channel state information for a downlink channel between the base station and a UE. In some examples, the channel state information determination component 1240 may determine, based on the current channel state information for the downlink channel, a predicted future channel state information for the downlink channel. The downlink communication component 1245 may apply the predicted future channel state information to a downlink communication to the UE over the downlink channel.

The reference signal reception component 1250 may receive, from a UE, a sounding reference signal. In some examples, the channel state information determination component 1240 may estimate the current channel state information for the downlink channel based on measurements of the uplink sounding reference signal and on a degree of reciprocity between the uplink sounding reference signal and the downlink channel. In some examples, the channel state information determination component 1240 may receive channel feedback from the UE pertaining to the current channel state information.

The interference component 1255 may transmit, to the UE, a request that the UE report interference estimated at the UE for the downlink channel. In some examples, the interference component 1255 may receive, from the UE, an indication of the interference estimated for the downlink channel.

In some examples, the channel state information determination component 1240 may determine the predicted future channel state information for the downlink channel based on both the current channel state information for the downlink channel and the interference estimated for the downlink channel. In some cases, the downlink communication to the UE over the downlink channel to which the predicted future channel state information is applied occurs a predetermined number of slots or subframes after a time to which the current channel state information pertains.

In some examples, the reference signal reception component 1250 may receive an uplink sounding reference signal from the UE. In some examples, the channel state information determination component 1240 may determine, based on a measurement of the sounding reference signal, a predicted future channel state information for a second time subsequent to a first time corresponding to the measurement of the sounding reference signal.

The uplink communication component 1260 may apply the predicted future channel state information to an uplink communication received at the second time. In some examples, the uplink communication component 1260 may apply the predicted future channel state information to a slot or subframe corresponding with the second time.

Figure 13:
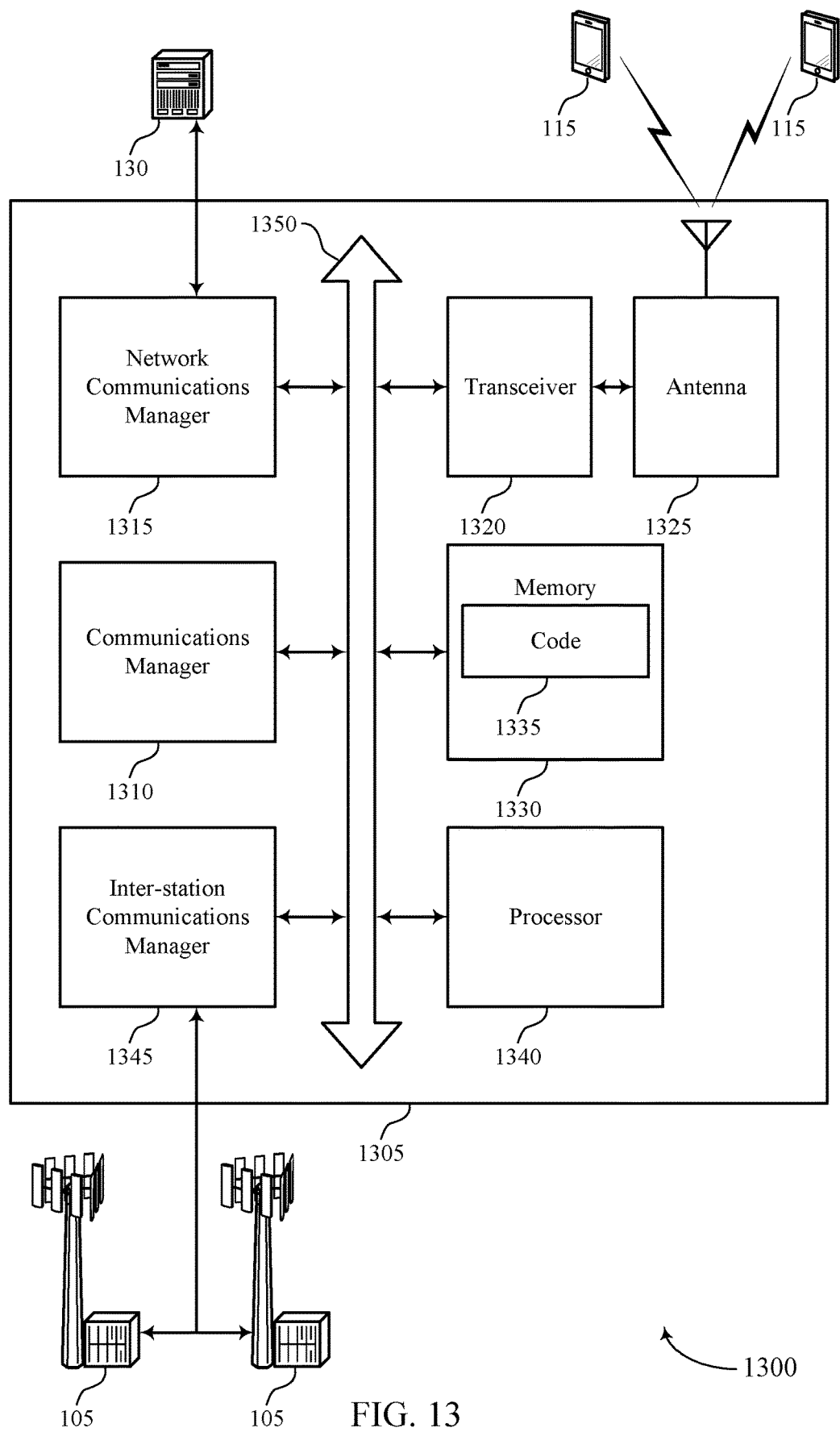
FIG. 13 shows a diagram of a system including a device that supports forward-looking channel state information prediction and reporting in accordance with aspects of the present disclosure.

FIG. 13 shows a diagram of a system 1300 including a device 1305 that supports forward-looking channel state information prediction and reporting in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a request that the UE report a predicted future channel state information measurement, receive, from the UE, a channel state information report that is indicative of a predicted future channel state information measurement determined in accordance with the request, and determine one or more downlink transmission parameters based on receiving the channel state information report. The communications manager 1310 may also determine current channel state information for a downlink channel between the base station and a UE, determine, based on the current channel state information for the downlink channel, a predicted future channel state information for the downlink channel, and apply the predicted future channel state information to a downlink communication to the UE over the downlink channel. The communications manager 1310 may also receive, from a UE, a sounding reference signal, determine, based on a measurement of the sounding reference signal, a predicted future channel state information for a second time subsequent to a first time corresponding to the measurement of the sounding reference signal, and apply the predicted future channel state information to an uplink communication received at the second time.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting forward-looking channel state information prediction and reporting).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
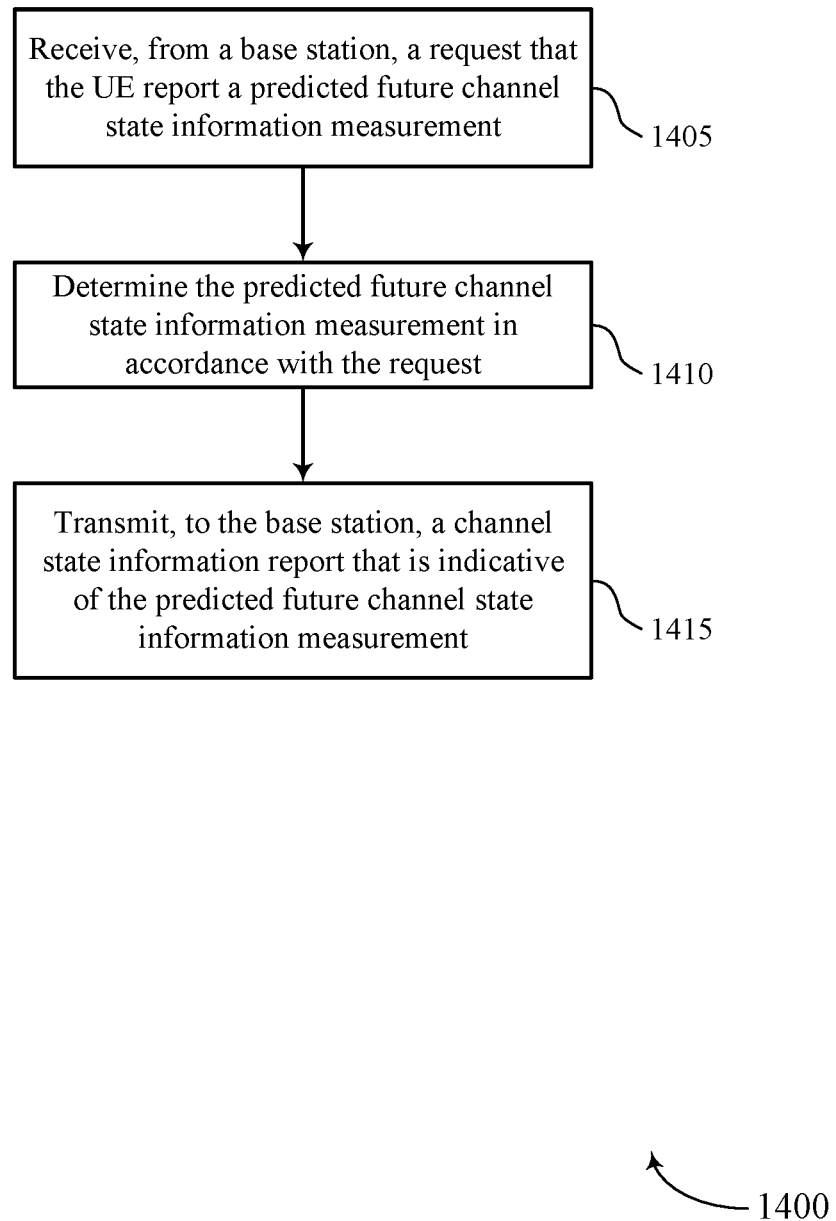
FIGS. 14 through 19 show flowcharts illustrating methods that support forward-looking channel state information prediction and reporting in accordance with aspects of the present disclosure.

FIG. 14 shows a flowchart illustrating a method 1400 that supports forward-looking channel state information prediction and reporting in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a request that the UE report a predicted future channel state information measurement. The operations of 1405 may be performed according to the methods described herein. In some examples, aspects of the operations of 1405 may be performed by a request reception component as described with reference to FIGS. 6 through 9.

At 1410, the UE may determine the predicted future channel state information measurement in accordance with the request. The operations of 1410 may be performed according to the methods described herein. In some examples, aspects of the operations of 1410 may be performed by a future channel state information component as described with reference to FIGS. 6 through 9.

At 1415, the UE may transmit, to the base station, a channel state information report that is indicative of the predicted future channel state information measurement. The operations of 1415 may be performed according to the methods described herein. In some examples, aspects of the operations of 1415 may be performed by a channel state transmission component as described with reference to FIGS. 6 through 9.

Figure 15:
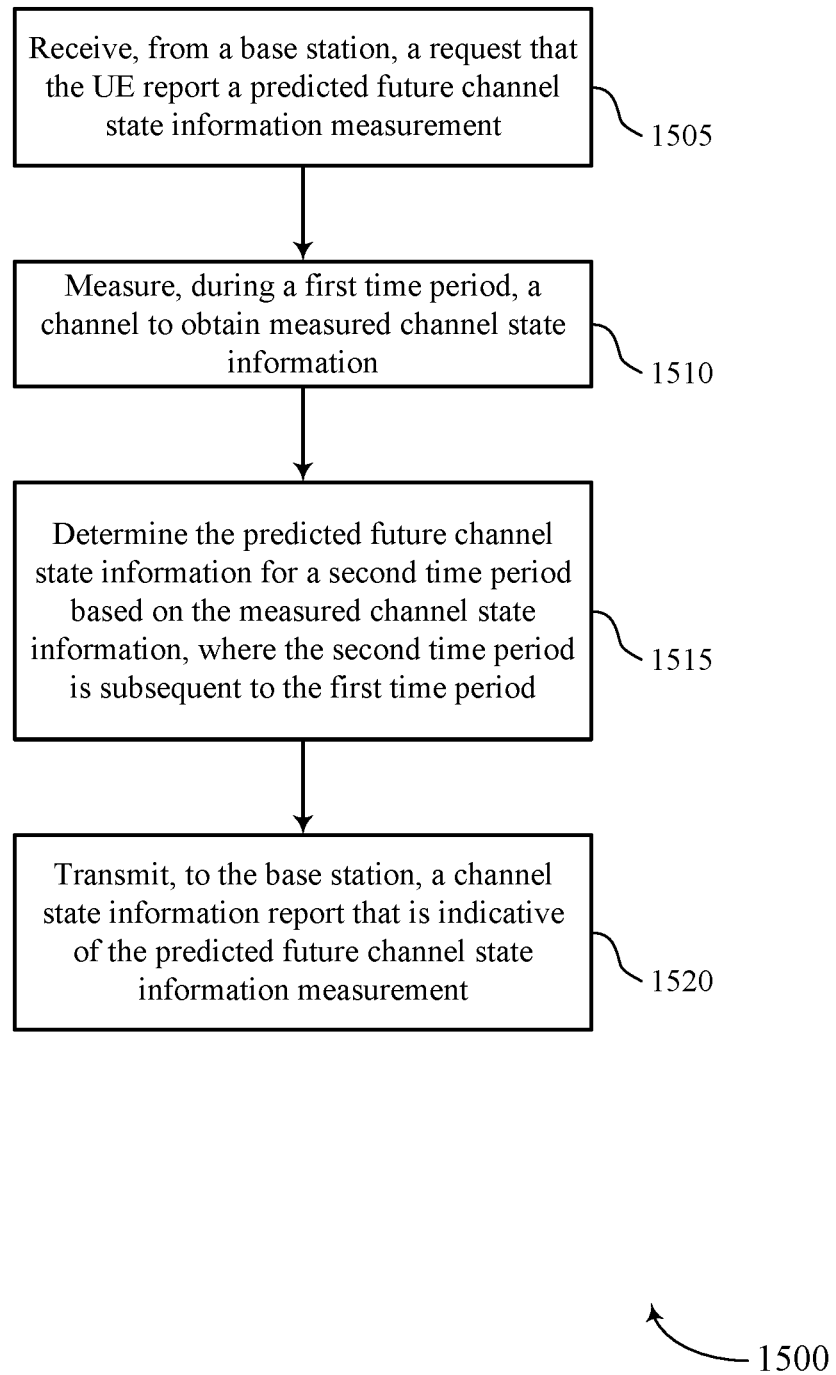

FIG. 15 shows a flowchart illustrating a method 1500 that supports forward-looking channel state information prediction and reporting in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a request that the UE report a predicted future channel state information measurement. The operations of 1505 may be performed according to the methods described herein. In some examples, aspects of the operations of 1505 may be performed by a request reception component as described with reference to FIGS. 6 through 9.

At 1510, the UE may measure, during a first time period, a channel to obtain measured channel state information. The operations of 1510 may be performed according to the methods described herein. In some examples, aspects of the operations of 1510 may be performed by a measurement component as described with reference to FIGS. 6 through 9.

At 1515, the UE may determine the predicted future channel state information for a second time period based on the measured channel state information, where the second time period is subsequent to the first time period. The operations of 1515 may be performed according to the methods described herein. In some examples, aspects of the operations of 1515 may be performed by a future channel state information component as described with reference to FIGS. 6 through 9.

At 1520, the UE may transmit, to the base station, a channel state information report that is indicative of the predicted future channel state information measurement. The operations of 1520 may be performed according to the methods described herein. In some examples, aspects of the operations of 1520 may be performed by a channel state transmission component as described with reference to FIGS. 6 through 9.

Figure 16:
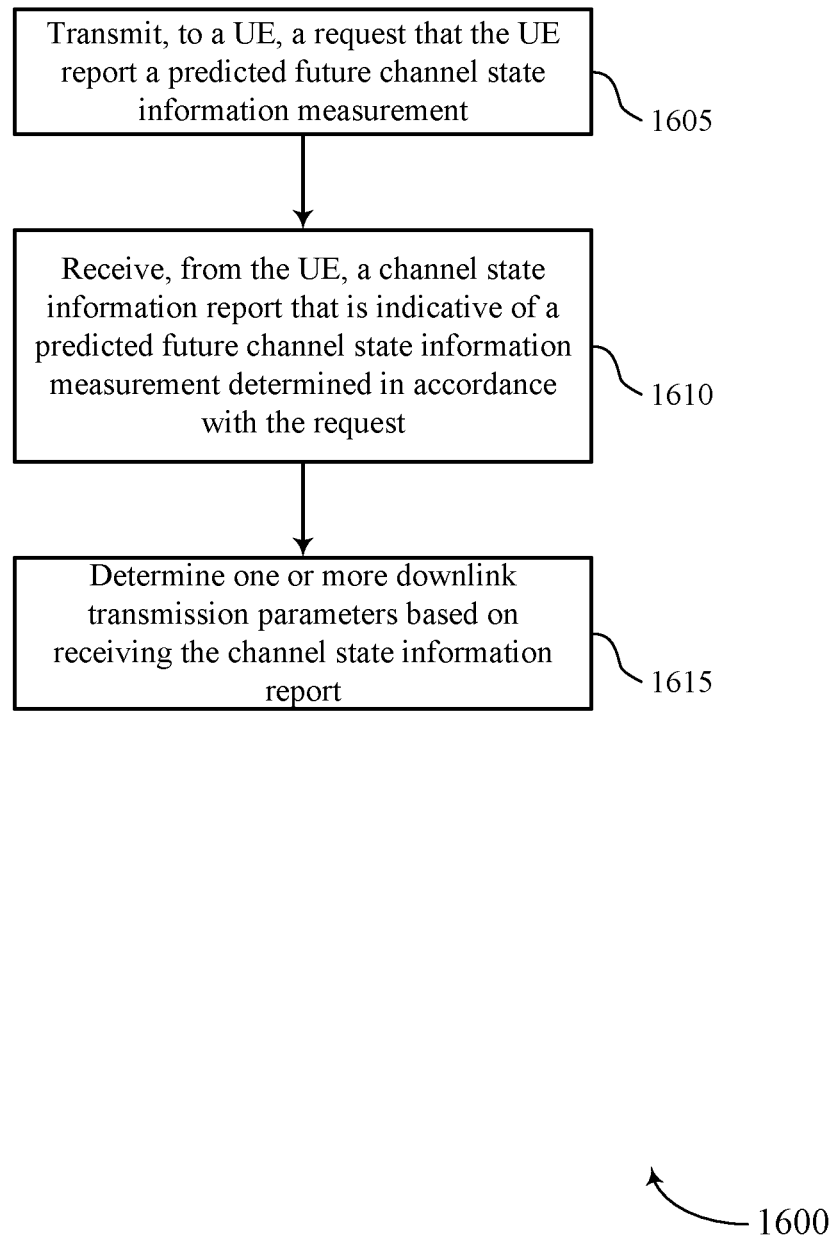

FIG. 16 shows a flowchart illustrating a method 1600 that supports forward-looking channel state information prediction and reporting in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, a request that the UE report a predicted future channel state information measurement. The operations of 1605 may be performed according to the methods described herein. In some examples, aspects of the operations of 1605 may be performed by a request transmission component as described with reference to FIGS. 10 through 13.

At 1610, the base station may receive, from the UE, a channel state information report that is indicative of a predicted future channel state information measurement determined in accordance with the request. The operations of 1610 may be performed according to the methods described herein. In some examples, aspects of the operations of 1610 may be performed by a channel state information reception component as described with reference to FIGS. 10 through 13.

At 1615, the base station may determine one or more downlink transmission parameters based on receiving the channel state information report. The operations of 1615 may be performed according to the methods described herein. In some examples, aspects of the operations of 1615 may be performed by a transmission parameter component as described with reference to FIGS. 10 through 13.

Figure 17:
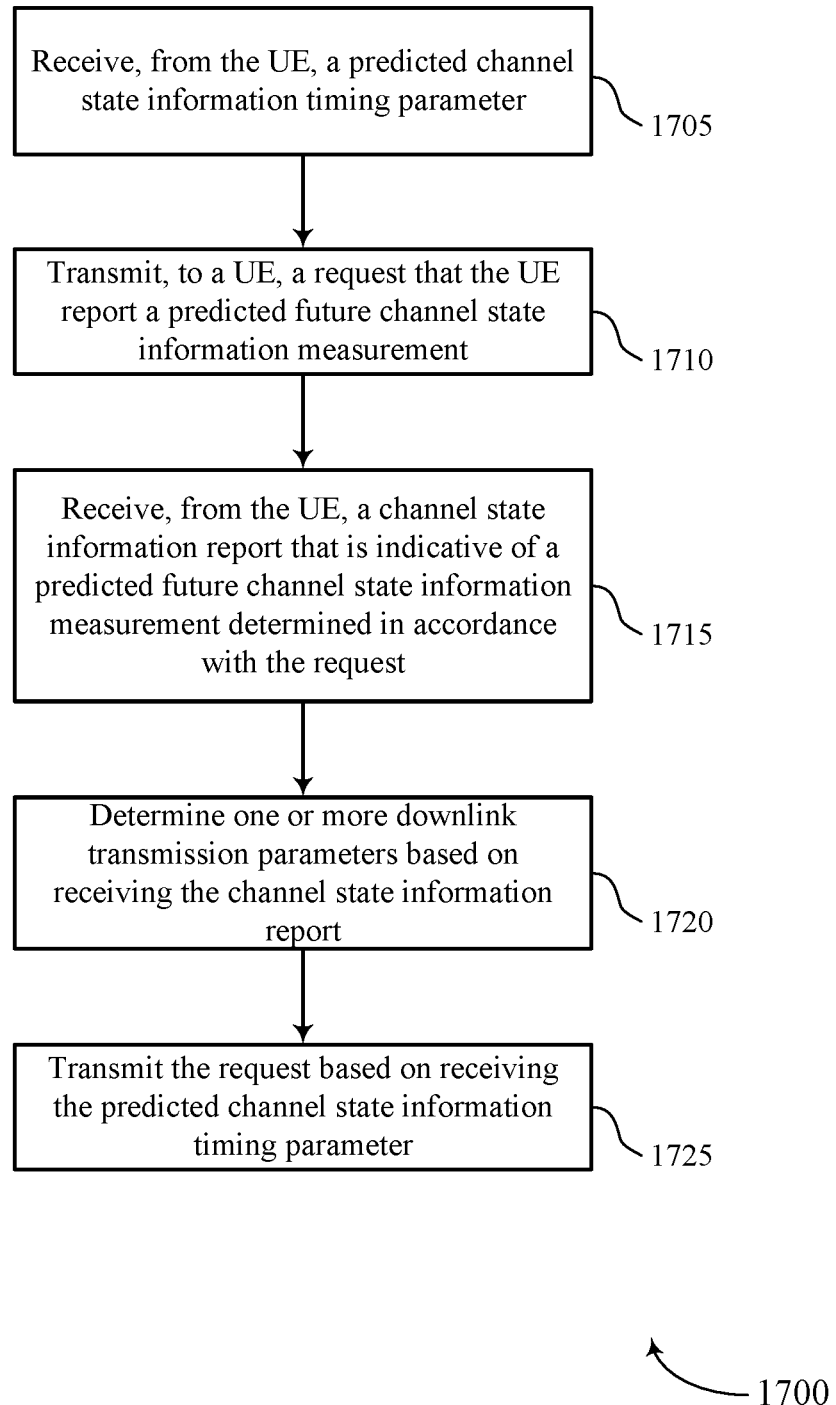

FIG. 17 shows a flowchart illustrating a method 1700 that supports forward-looking channel state information prediction and reporting in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may receive, from the UE, a predicted channel state information timing parameter. In some examples, the predicted channel state information timing parameter may be representative of a maximum delay supported by the UE between receipt of the request and a time period to which the predicted future channel state information measurement pertains or is representative of a range of time during which the UE supports determining the predicted future channel state information measurement. The operations of 1705 may be performed according to the methods described herein. In some examples, aspects of the operations of 1705 may be performed by a timing parameter component as described with reference to FIGS. 10 through 13.

At 1710, the base station may transmit, to a UE, a request that the UE report a predicted future channel state information measurement. The operations of 1710 may be performed according to the methods described herein. In some examples, aspects of the operations of 1710 may be performed by a request transmission component as described with reference to FIGS. 10 through 13.

At 1715, the base station may receive, from the UE, a channel state information report that is indicative of a predicted future channel state information measurement determined in accordance with the request. The operations of 1715 may be performed according to the methods described herein. In some examples, aspects of the operations of 1715 may be performed by a channel state information reception component as described with reference to FIGS. 10 through 13.

At 1720, the base station may determine one or more downlink transmission parameters based on receiving the channel state information report. The operations of 1720 may be performed according to the methods described herein. In some examples, aspects of the operations of 1720 may be performed by a transmission parameter component as described with reference to FIGS. 10 through 13.

At 1725, the base station may transmit the request based on receiving the predicted channel state information timing parameter. The operations of 1725 may be performed according to the methods described herein. In some examples, aspects of the operations of 1725 may be performed by a request transmission component as described with reference to FIGS. 10 through 13.

Figure 18:
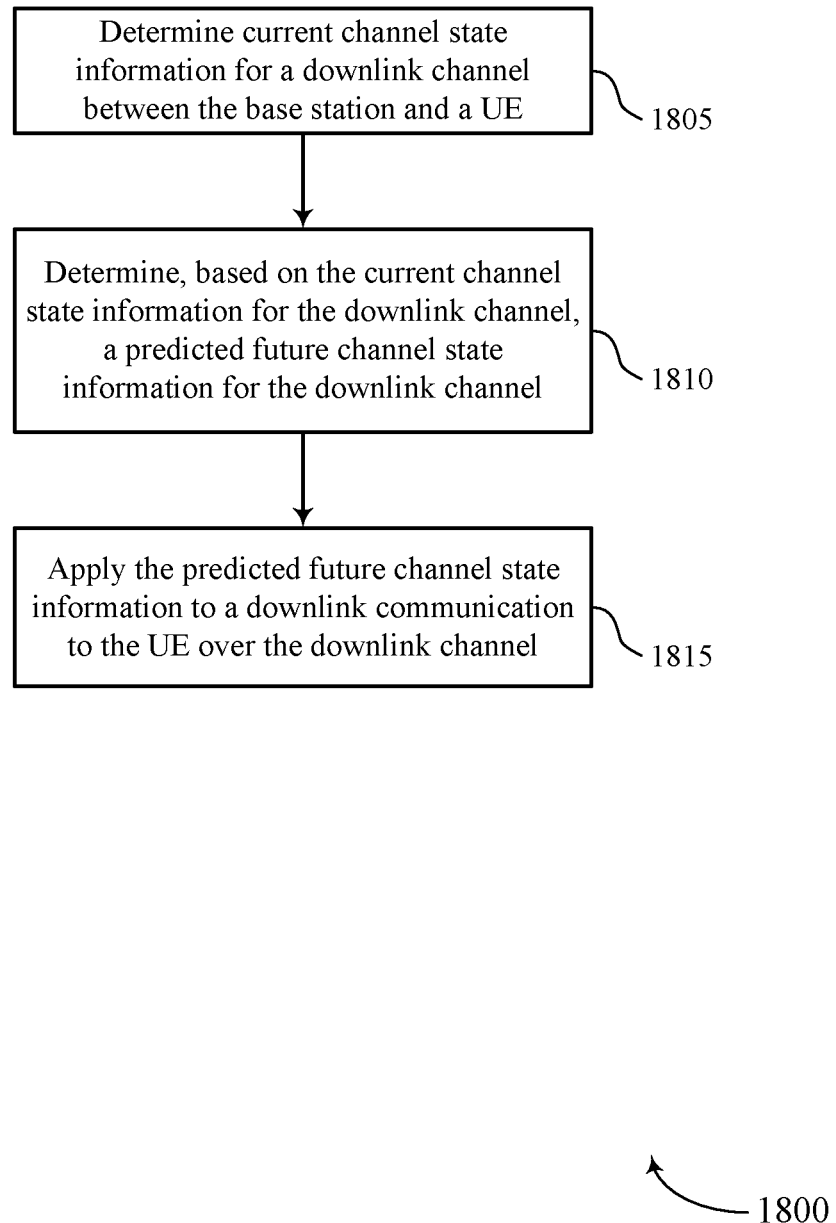

FIG. 18 shows a flowchart illustrating a method 1800 that supports forward-looking channel state information prediction and reporting in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may determine current channel state information for a downlink channel between the base station and a UE. The operations of 1805 may be performed according to the methods described herein. In some examples, aspects of the operations of 1805 may be performed by a channel state information determination component as described with reference to FIGS. 10 through 13.

At 1810, the base station may determine, based on the current channel state information for the downlink channel, a predicted future channel state information for the downlink channel. The operations of 1810 may be performed according to the methods described herein. In some examples, aspects of the operations of 1810 may be performed by a channel state information determination component as described with reference to FIGS. 10 through 13.

At 1815, the base station may apply the predicted future channel state information to a downlink communication to the UE over the downlink channel. The operations of 1815 may be performed according to the methods described herein. In some examples, aspects of the operations of 1815 may be performed by a downlink communication component as described with reference to FIGS. 10 through 13.

Figure 19:
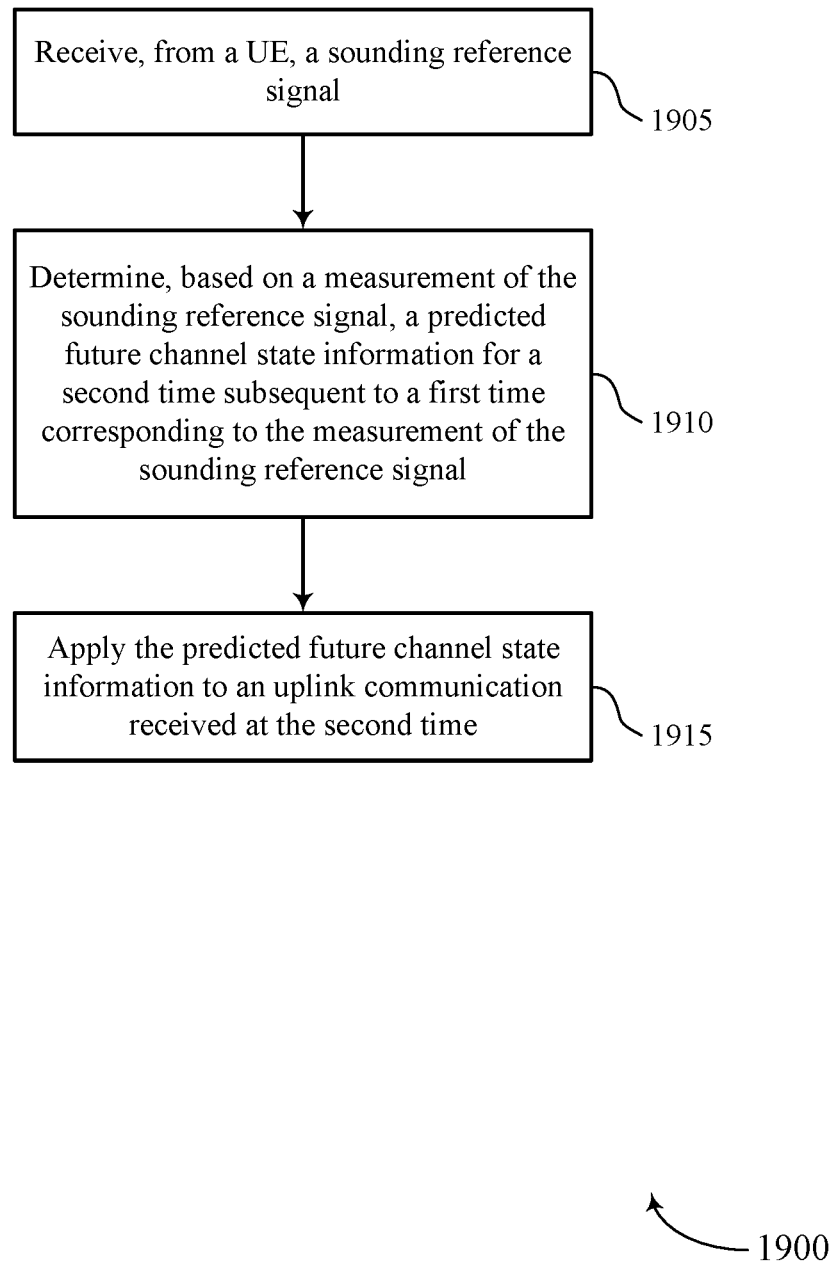

FIG. 19 shows a flowchart illustrating a method 1900 that supports forward-looking channel state information prediction and reporting in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a UE, a sounding reference signal. The operations of 1905 may be performed according to the methods described herein. In some examples, aspects of the operations of 1905 may be performed by a reference signal reception component as described with reference to FIGS. 10 through 13.

At 1910, the base station may determine, based on a measurement of the sounding reference signal, a predicted future channel state information for a second time subsequent to a first time corresponding to the measurement of the sounding reference signal. The operations of 1910 may be performed according to the methods described herein. In some examples, aspects of the operations of 1910 may be performed by a channel state information determination component as described with reference to FIGS. 10 through 13.

At 1915, the base station may apply the predicted future channel state information to an uplink communication received at the second time. The operations of 1915 may be performed according to the methods described herein. In some examples, aspects of the operations of 1915 may be performed by an uplink communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting an indication of a UE capability that indicates that the UE supports determining a predicted future channel state information measurement;
   receiving, from a base station, a request that the UE report the predicted future channel state information measurement based at least in part on the indicated UE capability;
   measuring, during a first time period, a channel to obtain a current channel state information measurement;
   determining the predicted future channel state information measurement for a second time period based at least in part on the current channel state information measurement and the request, wherein the second time period is subsequent to the first time period; and
   transmitting, to the base station, a channel state information report that is indicative of the predicted future channel state information measurement.

2. The method of claim 1, further comprising:
   receiving an indication from the base station of the second time period for which the predicted future channel state information measurement is to be reported.

3. The method of claim 2, wherein the indication represents a number of slots or subframes by which the second time period follows the first time period.

4. The method of claim 2, wherein receiving the indication comprises:
   receiving the indication via a configuration message received in advance of or together with the request.

5. The method of claim 1, further comprising:
   determining a predicted channel state information timing parameter that is representative of a maximum delay supported by the UE between receipt of the request and a time period to which the predicted future channel state information measurement pertains or is representative of a range of time during which the UE supports determining the predicted future channel state information measurement; and
   transmitting, to the base station, an indication of the predicted channel state information timing parameter, wherein the request is based at least in part on the predicted channel state information timing parameter.

6. The method of claim 5, wherein determining the predicted channel state information timing parameter further comprises:
   measuring a Doppler shift, wherein the predicted channel state information timing parameter is determined based at least in part on the Doppler shift.

7. The method of claim 5, wherein determining the predicted channel state information timing parameter further comprises:
   determining the predicted channel state information timing parameter supported by the UE based at least in part on a capability associated with the UE.

8. The method of claim 1, further comprising:
   transmitting, to the base station, an indication of the current channel state information measurement in addition to transmission of the channel state information report that is indicative of the predicted future channel state information measurement.

9. The method of claim 1, wherein transmitting the channel state information report that is indicative of the predicted future channel state information measurement comprises:
  including in the channel state information report a quantized version of the predicted future channel state information measurement.

10. The method of claim 1, wherein transmitting the channel state information report that is indicative of the predicted future channel state information measurement comprises:
  including in the channel state information report a delta version of the predicted future channel state information measurement that is relative to a current or previously reported channel state information measurement.

11. The method of claim 1, wherein:
  transmitting the channel state information report comprises periodically transmitting the channel state information report or aperiodically transmitting the channel state information report.

12. The method of claim 1, wherein:
  transmitting the channel state information report comprises transmitting the channel state information report based at least in part on wideband channels, sub-band channels, or a combination thereof.

13. The method of claim 1, wherein:
  receiving the request comprises receiving the request via downlink control information.

14. A method for wireless communication at a base station, comprising:
  receiving an indication of a user equipment (UE) capability that indicates that the UE supports determining a predicted future channel state information measurement;
  transmitting, to a UE, a request that the UE report predicted future channel state information measurement based at least in part on the indication;
  configuring the UE to measure, during a first time period, a channel to obtain a current channel state information measurement, wherein the predicted future channel state information measurement is for a second time period and based at least in part on the current channel state information measurement, and wherein the second time period is subsequent to the first time period;
  receiving, from the UE, a channel state information report that is indicative of the predicted future channel state information measurement determined in accordance with the request; and
  determining one or more downlink transmission parameters based at least in part on receiving the channel state information report.

15. The method of claim 14, further comprising:
  transmitting, to the UE, an indication of the second time period for which the predicted future channel state information measurement is to be reported, wherein the indication represents a number of slots or subframes by which the second time period follows the first time period.

16. The method of claim 15, wherein transmitting the indication comprises:
  transmitting the indication via a configuration message transmitted in advance of or together with the request.

17. The method of claim 14, further comprising:
  receiving, from the UE, a predicted channel state information timing parameter that is representative of a maximum delay supported by the UE between receipt of the request and a time period to which the predicted future channel state information measurement pertains or is representative of a range of time during which the UE supports determining the predicted future channel state information measurement; and
  transmitting the request based at least in part on receiving the predicted channel state information timing parameter.

18. The method of claim 17, wherein the predicted channel state information timing parameter is based at least in part on a Doppler shift, a capability associated with the UE, or a combination thereof.

19. The method of claim 14, further comprising:
  receiving, from the UE, an indication of the current channel state information measurement in addition to reception of the channel state information report that is indicative of the predicted future channel state information measurement.

20. The method of claim 14, wherein receiving the channel state information report that is indicative of the predicted future channel state information measurement comprises:
  determining that the channel state information report includes a quantized version of the predicted future channel state information measurement.

21. The method of claim 14, wherein receiving the channel state information report that is indicative of the predicted future channel state information measurement comprises:
  determining that the channel state information report includes a delta version of the predicted future channel state information measurement that is relative to a current or previously reported channel state information measurement.

22. The method of claim 14, wherein the one or more downlink transmission parameters comprise at least one of a pre-coding matrix indicator, a rank, a modulation and coding scheme, a selection of a frequency band, or a combination thereof.

23. The method of claim 14, wherein receiving the channel state information report further comprises:
  periodically receiving the channel state information report or aperiodically receiving the channel state information report; and
  receiving the channel state information report based at least in part on wideband channels, sub-band channels, or a combination thereof.

24. The method of claim 14, wherein:
  transmitting the request comprises transmitting the request via a downlink control information.

25. An apparatus for wireless communication at a user equipment (UE), comprising:
  a processor, memory coupled with the processor; and instructions stored in the memory and executable by the processor to cause the apparatus to:
    transmit an indication of a UE capability that indicates that the UE supports determining a predicted future channel state information measurement;
    receive, from a base station, a request that the UE report the predicted future channel state information measurement based at least in part on the indicated UE capability;
    measure, during a first time period, a channel to obtain a current channel state information measurement;
    determine the predicted future channel state information measurement for a second time period based at least in part on the current channel state information measurement and the request, wherein the second time period is subsequent to the first time period; and transmit, to the base station, a channel state information report that is indicative of the predicted future channel state information measurement.

26. An apparatus for wireless communication at a base station, comprising:

a processor, memory coupled with the processor; and instructions stored in the memory and executable by the processor to cause the apparatus to:

receive an indication of a UE capability that indicates that the UE supports determining a predicted future channel state information measurement;

transmit, to a UE, a request that the UE report the predicted future channel state information measurement based at least in part on the indication;

configure the UE to measure, during a first time period, a channel to obtain a current channel state information measurement, wherein the predicted future channel state information measurement is for a second time period and based at least in part on the current channel state information measurement, and wherein the second time period is subsequent to the first time period;

receive, from the UE, a channel state information report that is indicative of the predicted future channel state information measurement determined in accordance with the request; and determine one or more downlink transmission parameters based at least in part on receiving the channel state information report.

* * * * *